United States Patent
Maruyama et al.

(10) Patent No.: US 7,398,364 B2
(45) Date of Patent: Jul. 8, 2008

(54) SWITCHING METHOD OF DATA REPLICATION MODE

(75) Inventors: Naoko Maruyama, Kawasaki (JP); Yuichi Taguchi, Sagamihara (JP); Ryoji Furuhashi, Yokohama (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 162 days.

(21) Appl. No.: 11/116,268

(22) Filed: Apr. 28, 2005

(65) Prior Publication Data

US 2006/0195666 A1 Aug. 31, 2006

(30) Foreign Application Priority Data

Feb. 25, 2005 (JP) .............................. 2005-049934

(51) Int. Cl.
*G06F 12/00* (2006.01)
(52) U.S. Cl. ........................ 711/162; 711/112; 711/154; 707/204
(58) Field of Classification Search .................. 711/162, 711/112, 154; 707/204
See application file for complete search history.

(56) References Cited

U.S. PATENT DOCUMENTS

| | | | |
|---|---|---|---|
| 5,170,480 A | 12/1992 | Mohan et al. | |
| 5,615,329 A | 3/1997 | Kern et al. | |
| 6,112,267 A * | 8/2000 | McCormack et al. | 710/52 |
| 6,658,540 B1 * | 12/2003 | Sicola et al. | 711/162 |
| 7,100,007 B2 * | 8/2006 | Saika | 711/162 |
| 2002/0144057 A1 * | 10/2002 | Li et al. | 711/112 |
| 2004/0153604 A1 | 8/2004 | Nagasawa et al. | |
| 2004/0172509 A1 | 9/2004 | Takeda et al. | |
| 2005/0273565 A1 * | 12/2005 | Hirakawa et al. | 711/162 |

FOREIGN PATENT DOCUMENTS

| | | |
|---|---|---|
| JP | 7-239799 | 9/1995 |
| JP | 2001-236258 | 8/2001 |
| JP | 2004-259079 | 9/2004 |

* cited by examiner

*Primary Examiner*—Stephen C Elmore
(74) *Attorney, Agent, or Firm*—Antonelli, Terry, Stout & Kraus, LLP.

(57) ABSTRACT

In remote data replication between storage systems, there are cases where the storage extent capacity used as the temporary storage extent in the storage system will incur waste. In a system having a management computer, a host computer, a first storage system, and a second storage system, when maintaining the replicated data of the first storage system in the second storage system via remote data replication, a change or the like in the traffic from the host computer to the first storage system is monitored, and the management computer instructs the storage system to switch the remote data replication mode in accordance with such traffic.

14 Claims, 22 Drawing Sheets

FIG.3

DATA REPLICATION CONSTITUTION INFORMATION TABLE

| DATA REPLICATION SOURCE STORAGE SYSTEM IDENTIFICATION NUMBER | DATA REPLICATION SOURCE STORAGE EXTENT IDENTIFICATION INFORMATION | DATA REPLICATION SOURCE STORAGE EXTENT CAPACITY | DATA REPLICATION DESTINATION STORAGE SYSTEM IDENTIFICATION NUMBER | DATA REPLICATION DESTINATION STORAGE EXTENT IDENTIFICATION INFORMATION | DATA REPLICATION METHOD |
|---|---|---|---|---|---|
| 11000 | 00:00 | 2000MB | 12000 | 00:02 | SECOND ASYNCHRONOUS METHOD |
| 11000 | 00:01 | 1000MB | 12000 | 00:03 | FIRST ASYNCHRONOUS METHOD |

I/O ACCESS INFORMATION TABLE

| STORAGE EXTENT IDENTIFICATION NUMBER | TIME (DAY) | | | |
|---|---|---|---|---|
| | 0 | -1 | -2 | ... |
| 00:00 | 30 | 50 | 1500 | ... |
| 00:01 | 1200 | 1100 | 600 | ... |

DATA REPLICATION BUFFER EXTENT CONFIGURATION INFORMATION TABLE

| STORAGE EXTENT IDENTIFICATION NUMBER | DATA REPLICATION MEMORY BUFFER EXTENT CAPACITY USED (MB) | DATA REPLICATION DISK BUFFER EXTENT CAPACITY USED (MB) |
|---|---|---|
| 00:00 | 0 | 200 |
| 00:01 | 64 | 0 |

I/O RATE LOG TABLE

| STORAGE EXTENT IDENTIFICATION INFORMATION | TIME (DAY) | | | |
|---|---|---|---|---|
| | 0 | -1 | -2 | ... |
| 00:00 | 30 | 50 | 1500 | ... |
| 00:01 | 1200 | 1100 | 600 | ... |

DATA REPLICATION BUFFER EXTENT MANAGEMENT TABLE

| DATA REPLICATION SOURCE STORAGE SYSTEM IDENTIFICATION NUMBER | DATA REPLICATION SOURCE STORAGE EXTENT IDENTIFICATION NUMBER | USED DISK BUFFER CAPACITY (MB) | USED MEMORY BUFFER CAPACITY (MB) | DATA REPLICATION DESTINATION STORAGE SYSTEM IDENTIFICATION NUMBER | DATA REPLICATION SOURCE STORAGE EXTENT IDENTIFICATION NUMBER | USED DISK BUFFER CAPACITY (MB) | USED MEMORY BUFFER CAPACITY (MB) |
|---|---|---|---|---|---|---|---|
| 11000 | 00:00 | 200 | 0 | 12000 | 00:02 | 200 | 0 |
| 11000 | 00:01 | 0 | 64 | 12000 | 00:03 | 0 | 64 |

STORAGE EXTENT INFORMATION TABLE

| STORAGE SYSTEM IDENTIFICATION NUMBER | STORAGE EXTENT IDENTIFICATION NUMBER | STORAGE EXTENT CAPACITY (MB) |
|---|---|---|
| 11000 | 00:00 | 2000 |
| 11000 | 00:01 | 1000 |

DATA REPLICATION METHOD SWITCH INFORMATION TABLE

| STORAGE EXTENT IDENTIFICATION INFORMATION | FIRST SWITCH THRESHOLD | SECOND SWITCH THRESHOLD | DURATION (DAY) EXCEEDING SWITCH THRESHOLD |
|---|---|---|---|
| 00:00 | 1500 | 100 | 2 |
| 00:01 | 1000 | 50 | 2 |

3260
3261  3262  3263

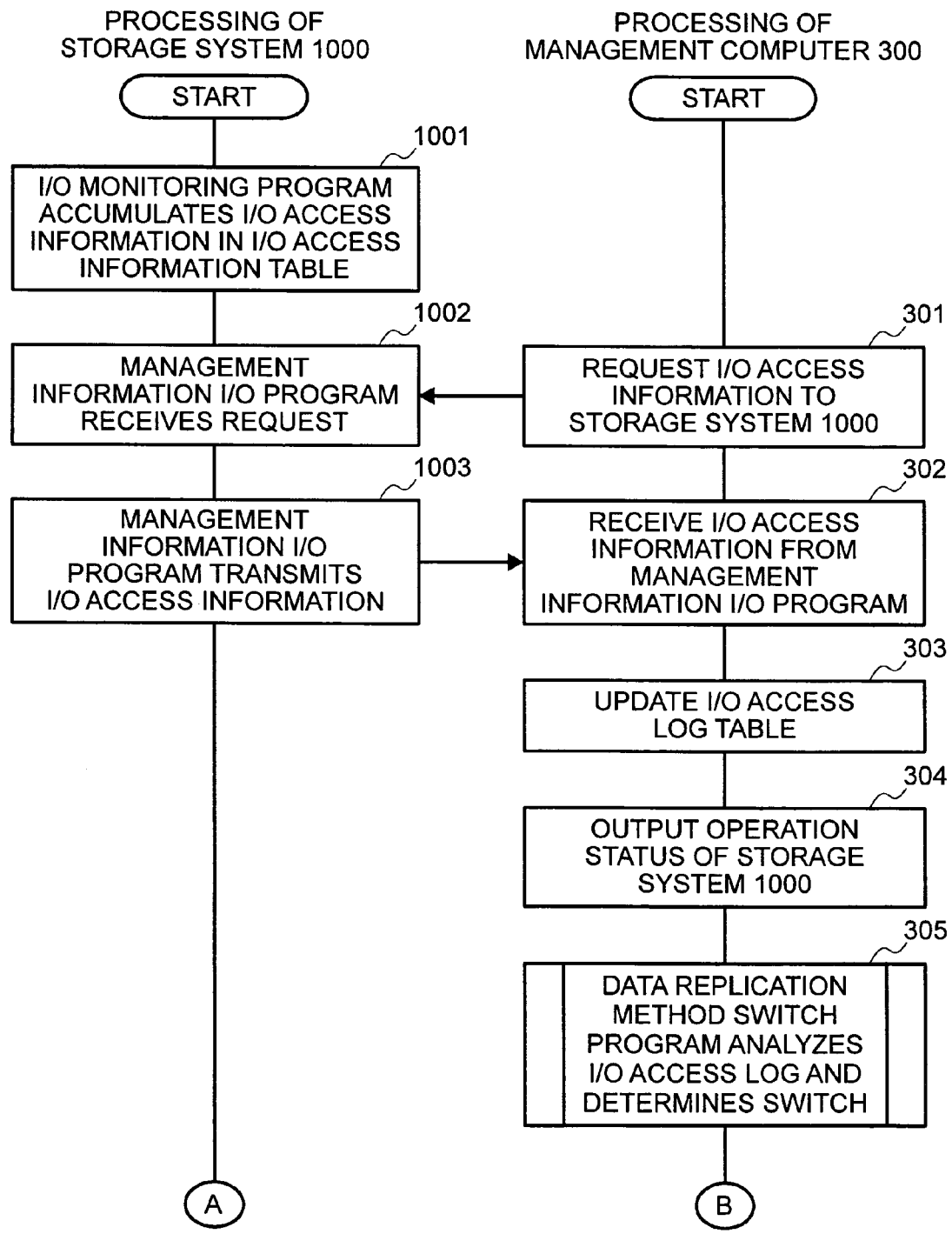

FIG.22

VIRTUAL STORAGE EXTENT CONFIGURATION INFORMATION TABLE

| VIRTUAL STORAGE SYSTEM IDENTIFICATION INFORMATION | VIRTUAL STORAGE EXTENT IDENTIFICATION INFORMATION | PHYSICAL STORAGE SYSTEM IDENTIFICATION INFORMATION | PHYSICAL STORAGE EXTENT IDENTIFICATION INFORMATION | STORAGE EXTENT CAPACITY |
|---|---|---|---|---|
| 11000 | 04:01 | 13000 | 01:01 | 2000MB |
| 11000 | 04:02 | 13000 | 01:02 | 3000MB |
| 11000 | 04:03 | 13000 | 01:03 | 4000MB |

FIG.23

DATA REPLICATION METHOD INFORMATION TABLE

| STORAGE SYSTEM IDENTIFICATION INFORMATION | RETAINED DATA REPLICATION METHOD | | |
|---|---|---|---|
| 11000 | FIRST ASYNCHRONOUS DATA REPLICATION METHOD | SECOND ASYNCHRONOUS DATA REPLICATION METHOD | SYNCHRONOUS DATA REPLICATION METHOD |
| 13000 | SYNCHRONOUS DATA REPLICATION METHOD | | |
| 12000 | FIRST ASYNCHRONOUS DATA REPLICATION METHOD | SECOND ASYNCHRONOUS DATA REPLICATION METHOD | |
| 14000 | SYNCHRONOUS DATA REPLICATION METHOD | | |

SWITCHING METHOD OF DATA REPLICATION MODE

BACKGROUND OF THE INVENTION

The present invention generally relates, in general to a computer system, and, more particularly, the invention relates to a method of management of a data transfer between storage systems in a computer system.

In recent years, in order to continue the processing in a computer system, even when a malfunction occurs in a storage system (hereinafter referred to as a "first storage system" or "primary storage system") in the computer system, such as during a disaster, technology for replicating data recorded in the first storage system to another storage system (hereinafter referred to as the "secondary storage system"), which has been established at a remote location from the first storage system, is becoming important. Patent Document 1 (U.S. Pat. No. 5,170,480) discloses technology (hereinafter referred to as "synchronous remote data duplication") for proceeding with the processing in the first storage system after the data is updated in the first storage system and after the data replication in the second storage system is confirmed.

Further, Patent Document 2 (Japanese Patent Laid-Open Publication No. H7-239799) discloses, in addition to the technology of synchronous remote duplication, technology for continuing the processing in the computer system only with the update of the first storage system, and replicating data in the secondary storage system asynchronous with the update of data in the first storage system (hereinafter referred to as "asynchronous remote data replication").

Moreover, Patent Document 3 (Japanese Patent Laid-Open Publication No. 2004-259079) discloses, as a type of asynchronous remote duplication, technology in which the primary storage system stores the update information of data to be stored therein as a journal (update log), the primary storage system forwards this journal to the secondary storage system, and the secondary storage system updates the data stored therein in the same manner as the primary storage system by employing the forwarded journal.

Patent Document 4 (Japanese Patent Laid-Open Publication No. 2001-236258) discloses technology for transferring the computer system implementing asynchronous remote duplication to implement a synchronous remote duplication based on the information of a malfunction that has occurred.

The foregoing three types of remote duplications in accordance with conventional technology each have unique characteristics, and they are used according to the particular objective. Nevertheless, in accordance with conventional technology, once the mode of remote duplication to be executed with the system is determined, unless the administrator or the like stops the system and changes the mode, remote duplication is executed in the system based on the same mode. Here, with this technology, depending on the operating status of the system, there are cases where resources in the system will incur a waste.

For example, with the asynchronous remote duplication process disclosed in Patent Document 3, when an update of data in the first storage system is not conducted frequently, the storage extent secured for storing the journal will hardly be used, and the storage capacity used for such portion will be wasted.

Meanwhile, Patent Document 4 discloses technology for automatically changing the remote replication mode in the system for the purpose of preserving data in the system. Nevertheless, since no consideration is given to the effective use of resources in the system, even if the remote replication mode is merely changed using the technology disclosed in Patent Document 4, a waste of resources cannot be overcome.

SUMMARY OF THE INVENTION

As an embodiment of the present invention, a configuration is employed for monitoring the traffic from the computer to the primary storage system and for appropriately switching the remote data replication mode between the storage systems based on a change in the traffic.

Here, in the storage system, upon changing from asynchronous remote data replication to synchronous remote data replication, the resource journal area or cache memory area) used for the asynchronous remote data replication may be released.

Further, as another embodiment, there is a configuration having a management computer which determines whether the switching of the data replication mode is necessary and which transmits the switching request to the storage system. The management computer is connected to the primary storage system and to the secondary storage system, and it transmits and receives management information relating to the storage system. Moreover, the management system may adopt a configuration capable of determining whether the remote data replication mode should be switched based on a prescribed threshold. The management computer determines the necessity of switching based on this threshold and the traffic, and the storage system that received the switching request from the management computer conducts the switching processing. Other configurations of the present invention will become apparent from the following description of the preferred embodiment, but the present invention shall in no way be limited to such descriptions as a matter of course.

It becomes possible to select the remote data replication mode according to change in the operating status of the system and to apply it to the system, and the storage extent in the storage system can be used effectively without waste.

BRIEF DESCRIPTION OF THE DRAWINGS

FIG. 3 is a diagram showing an example of a table storing the configuration information for remote data duplication;

FIG. 4 is a diagram showing an example of a table storing I/O rate information;

FIG. 5 is a diagram showing an example of a table storing configuration information of the data replication buffer extent;

FIG. 7 is a diagram showing an example of a table storing an I/O rate log;

FIG. 8 is a diagram showing an example of a table storing management information of the data replication buffer extent;

FIG. 9 is a diagram showing an example of a table storing information of the storage extent;

FIG. 10 is a diagram showing an example of a table storing data replication mode switch information;

FIG. 11 is a flowchart showing an example of processing pertaining to the switching of the data replication mode;

FIG. 22 is a diagram showing an example of a table storing configuration information of the virtual storage extent;

FIG. 23 is a diagram showing an example of a table for registering information on the data replication mode retained in the storage system;

DESCRIPTION OF THE PREFERRED EMBODIMENTS

Embodiments of the present invention are now explained with reference to the drawings.

Embodiment 1

Figure 1:
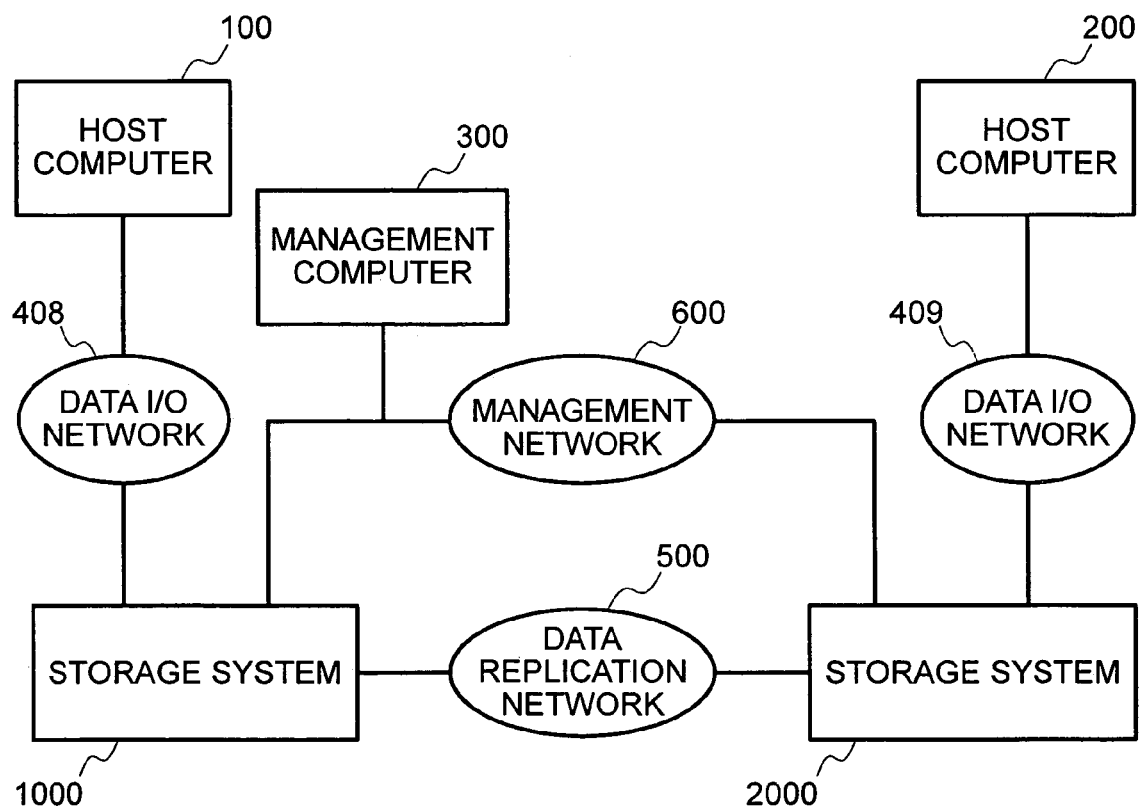
FIG. 1 is a block diagram showing an example of the computer system according to a first embodiment of the present invention.

The first embodiment of the present invention will now be explained with reference to FIG. 1 to FIG. 18. FIG. 1 is a diagram showing an example of the system according to the first embodiment.

The computer system of this embodiment has a primary system and the secondary system. The primary system has a host computer 100 and a storage system (hereinafter sometimes referred to as the "storage device") 1000. The host computer 100 and the storage system 1000 are mutually connected via a data I/O network 408. The secondary system also has a host computer 200 and a storage system 2000, and these devices are mutually connected via a data I/O network 409. Further, the storage system 1000 and the storage system 2000 are mutually connected via a data replication network 500, and they mutually communicate with each other via this network 500. The data I/O networks 408, 409 and the data replication network 500 are configured from a standard network connection mode, such as a fibre channel or Ethernet (registered trademark). In the present embodiment, the replication of data written from the host computer 100 to the storage system 1000 to the storage system 2000 via the data replication network 500 is referred to as remote data replication.

Further, the computer system has a management computer 300 for managing the remote data replication between the storage systems. The management computer 300 is connected to the storage system 1000 and to the storage system 2000 via a management network 600. The management network 600 is configured from a network connection system, such as the Ethernet. Further, the management network 600 may be the same as the data replication network 500. The management computer 300 and the storage systems 1000, 2000 mutually transmit and receive management information via these networks.

In the present embodiment, the management computer 300 instructs the storage devices 1000 and 2000 to switch the remote data replication mode being conducted between the storage systems according to the traffic (especially write access) from the host computer 100 to the storage system 1000.

Since the host computers 100 and 200 are standard computers, they have an interface for connecting to the network, processor, memory, display and so on.

Figure 2:
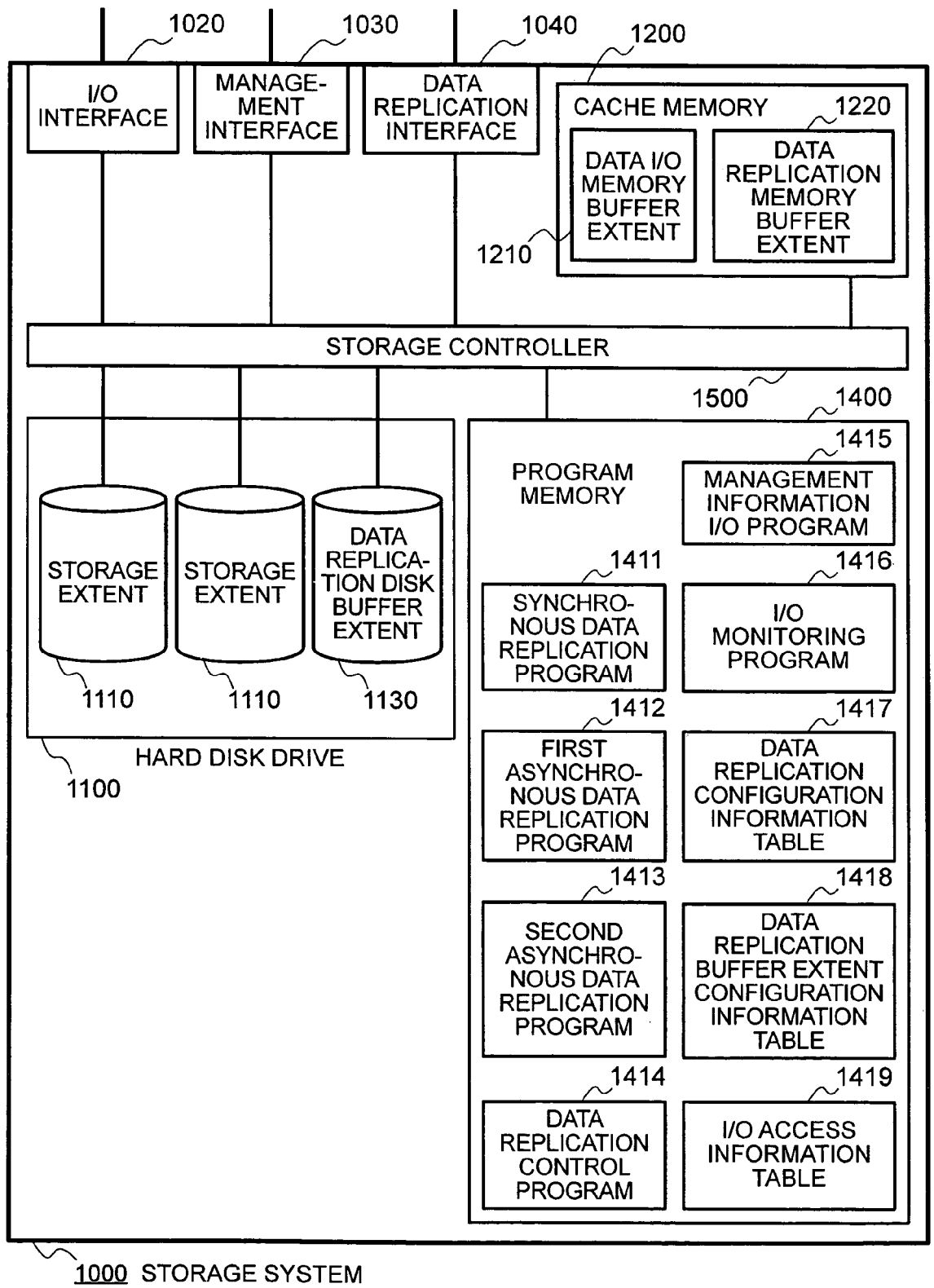
FIG. 2 is a block diagram showing an example of the storage system used in the computer system of FIG. 1.

FIG. 2 is a diagram showing an example of the internal configuration of the storage system 1000.

The storage system 1000 has a storage controller 1500, a hard disk drive 1100, a cache memory 1200, a program memory 1400, an I/O interface 1020, a management interface 1030, and a data replication interface 1040.

The storage controller 1500 is connected to the other configurations of the storage system 1000 via a bus or the like. Communication between the storage system 1000 and the other systems is conducted via the I/O interface 1020, management interface 1030 or data replication interface 1040 depending on the purpose of use. Incidentally, the internal configuration of the storage system 2000 is the same as that of the storage system 1000.

The cache memory 1200 is a semiconductor memory system. The cache memory 1200 is used as a temporary data storage extent. The cache memory 1200 has a data I/O memory buffer extent 1210 and a data replication memory buffer extent 1220. The data I/O memory buffer extent 1210 is used as the storage extent for temporarily storing data incidental to the writing request when a writing request is given from the host computer 100. Further, the data replication memory buffer extent 1220 is used as the storage extent for temporarily storing data to be forwarded during the remote data replication between the storage systems.

The hard disk drive 1100 is a recording medium formed from, for instance, one or more magnetic disk devices (so-called hard disk drives). Incidentally, the recording medium is not limited to a hard disk drive, since it may also be a DVD, semiconductor storage system, or tape system. The storage controller 1500 provides the physical storage extent of the hard disk drive 1100 logically to the host computer 100 or the like as one or a plurality of storage extents (volumes). In the present embodiment, the storage controller 1500 sets the storage extent 1110 and data replication disk buffer extent 1130 as the logical storage extent (volume). The storage extent 1110 is used as the extent for storing data transmitted from the host computer 100. The data replication disk buffer extent 1130 is used as the storage extent for recording the journal.

The program memory 1400 is a magnetic disk system or a semiconductor memory system. The program memory 1400 stores various program groups and information to be executed by the storage controller 1500 for controlling the operation of the storage system 1000. More specifically, the program memory 1400 stores a synchronous data replication program 1411, a first asynchronous data replication program 1412, a second asynchronous data replication program 1413, a data replication control program 1414, a management information I/O program 1415, an I/O monitoring program 1416, a data configuration information table 1417, a buffer extent configuration information table 1418, and an I/O rate information table 1419.

The synchronous data replication program 1411 is a program to be executed by the storage controller 1500 when synchronous remote data replication is to be executed between the storage systems.

In synchronous remote data replication, the storage system 1000 does not use the data replication memory buffer extent 1220 upon receiving the writing request, but stores the data requested from the host computer 100 to be written in the hard disk drive 1100 in the storage extent 1110 (or the data I/O memory buffer extent 1210), and then it forwards this data to the storage extent 1110 in the storage system 2000 via the data replication network 500. And, the storage system 1000 stops receipt of a further writing request from the host computer 100 for writing data into the storage extent until it receives a notice indicating that the storing of data to the storage extent in the storage system 2000 has been completed. Thus, the data stored in the replication source storage extent and the data stored in the replication destination storage extent will always be identical.

The first asynchronous data replication program 1412 is a program that is executed by the storage controller 1500 upon executing asynchronous remote data replication between the storage systems by employing the data replication memory buffer extent 1220 as the buffer. The asynchronous remote data replication employing the data replication memory buffer extent 1220 as the buffer is hereinafter referred to as the "first asynchronous remote data replication". In the case of such first asynchronous remote data replication, the storage system 1000 stores the data, which the host computer 100 requested to be written in the storage extent 1110, temporarily in the data I/O memory buffer extent 1210. At this point in time, the storage system 1000 notifies the host computer 100 of the completion of writing. The storage system 1000 then writes the data in the data I/O memory buffer 1210 in the storage extent 1110 on the one hand, and transfers the data in the data I/O memory buffer to the data replication buffer extent 1220, and forwards the data to the storage system 2000. The storage system 2000 that has received the data updates the data according to the update order in the storage system 1000.

The second asynchronous data replication program 1413 is a program executed by the storage controller 1500 upon executing asynchronous remote data replication between the storage systems by employing the data replication disk buffer extent 1130 as the buffer. The asynchronous remote data replication process employing the data replication disk buffer extent 1130 as the buffer is hereinafter referred to as the "second asynchronous remote data replication". In the case of such second asynchronous remote data replication, when the host computer 100 makes a writing request in the storage extent 1110, the storage system 1000 temporarily stores the update information of data as a journal in the data replication disk buffer extent 1130. Here, the storage system 1000 notifies the host computer 100 that the update of data is complete. Thereafter, the storage system 1000 transfers the stored update information to the storage system 2000. The storage system 2000 updates the data according to the update order in the storage system 1000.

The data replication control program 1414 is a program that is executed the storage controller 1500 when the storage system 1000 switches the mode of the remote data replication (hereinafter sometimes referred to as the "remote data replication mode") that it personally executes according to a request from the management computer 300.

The management information I/O program 1415 is a program that is executed by the storage controller 1500 upon transmitting and receiving management information between the storage system 1000 and the management computer 300. Further, this program is also executed by the storage controller 1500 upon relaying the received management information to the program or table in the program memory 1400. For instance, when a data replication mode switch request is issued from the management computer 300, this program is executed upon receiving such information and relaying it to the data replication control program 1414.

The data replication configuration information table 1417 is a table which is used for storing information relating to the configuration of the remote data replication of the storage extent 1110. When remote data replication is to be conducted between the storage system 1000 and the storage system 2000, the storage extent 1110 of the storage system 1000 (hereinafter also referred to as the "replication source storage system") and the storage extent 1110 of the storage system 2000 (hereinafter also referred to as the "replication destination storage system") are associated as a pair (hereinafter referred to as a "pair association"). This pair association is registered in the data replication configuration information table 1417.

FIG. 3 is a diagram showing an example of the data replication configuration information table 1417. Information concerning the storage extent of both storage systems in the pair association is stored in the data replication configuration information table 1417 in a mutually associated manner.

Specifically, the data replication configuration information table 1417 has, for each pair association, a field 14171 which registers information for identifying the replication source storage system, a field 14172 which registers information for identifying the storage extent of the replication source storage system, a field 14173 which registers information of the storage capacity of the storage extent of the replication source storage system, a field 14174 which registers information for identifying the replication destination storage system, a field 14175 which registers information for identifying the storage extent of the replication destination storage system, and a field 14170 which registers information as to which remote data replication mode is being conducted in the pair association.

Here, the storage system 1000 and the like have an identification number, which is a unique number for identifying the system, such as the system serial number or World Wide Name. In the present embodiment, the identification number of the storage system 1000 will be 11000, and, similarly, the identification number of the storage system 2000 will be 12000. In FIG. 3, the storage extent 1110 having the identification information 00:00 for the storage system 1000 represented by the identification number 11000 and the storage extent 1110 having the identification information 00:02 for the storage system 2000 represented by the identification number 12000 are of a pair association, and information is requested indicating that the remote data replication system between such storage extents 1110, in a pair association, is a second asynchronous remote data replication. Further, similarly, the storage extent 1110 having the identification number 00:01 for the storage system 1000 represented by the identification number 11000 and the storage extent 1110 having the identification number 00:03 for the storage system 2000 represented by the identification number 12000 are of a pair association, and information is registered indicating that the remote data replication system between such storage extents 1110 in a pair association is a first asynchronous remote data replication.

The I/O monitoring program 1416 is a program executed by the storage controller 1500 upon monitoring the I/O rate from the host computer 100 to the storage extent 1110 in the storage system 1000. The storage controller 1500 accumulates, in the I/O access information table 1419, the information regarding the number of accesses ("access rate") from the host computer 100 for every fixed period of each storage extent 1110.

FIG. 4 is a diagram showing an example of the I/O rate information table 1419. As described above, the I/O access information table 1419 registers information regarding the number of accesses from the host computer 100 for each storage extent 1110 of the storage system 1000. More specifically, the I/O access information table has a field 14190 which registers the identifier of the storage extent, and fields 14191 to 14193 that register information on the number of accesses for every fixed period. Here, the field 14191 registers information on the I/O rate per the latest day to the storage extent 1110, the field 14192 registers information on the I/O rate for the previous day, and the field 14193 registers information on the I/O rate for the day before that. Such I/O rate information is transmitted to the management computer 300 according to the request from the management computer 300.

In FIG. 4, an example is shown where the I/O rate to the storage extent 1100 identified with the identification number 00:00 is 30 accesses for the most recent day, 50 accesses for the day before, and 1500 access for two days before. Incidentally, although the measurement interval of the I/O rate in this embodiment is set for each day, the measurement interval may be set for each hour, each 5 minutes, or each 10 seconds, and the measurement interval may be changed according to the circumstances.

Information on the used capacity of the data replication memory buffer extent 1220 or the data replication disk buffer extent 1130 (hereinafter sometimes collectively referred to as the "data replication buffer extent") to be used upon subjecting the data stored in the storage extent 1110 to remote data replication is accumulated in the data replication buffer extent configuration information table 1418 based on each storage extent 1110.

FIG. 5 is a diagram showing an example of the data replication buffer extent configuration information table 1418. Specifically, the data replication buffer extent configuration information table 1418 has, for each storage extent 1110, a field which registers information for identifying the storage extent, a field 14182 which registers information on the used capacity of the data replication memory buffer extent 1220 to be used upon subjecting the data stored in the corresponding storage extent to remote data replication, and a field 14183 which registers information on the used capacity of the data replication disk buffer extent 1130.

In FIG. 5, in the remote data replication of the data stored in the storage extent 1110 represented by the identification number 00:00, the used capacity of the data replication memory buffer extent 1220 is 0 MB, and the used capacity of the data replication disk buffer extent 1130 is 200 MB. Further, in the remote data replication of the data stored in the storage extent 1110 represented by the identification number 00:01, the used capacity of the data replication memory buffer extent 1220 is 64 MB, and the used capacity of the data replication disk buffer extent 1130 is 0 MB.

Figure 6:
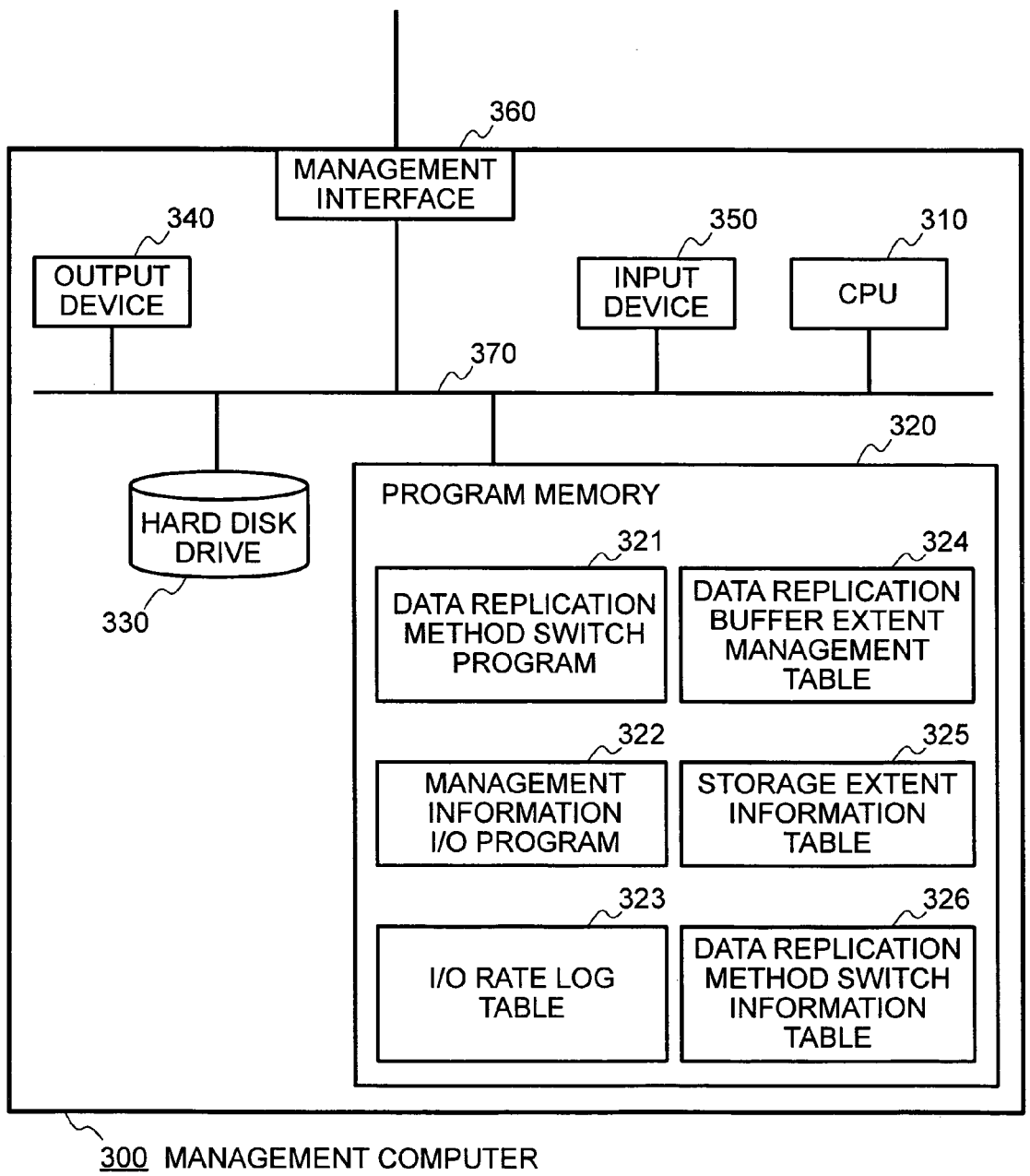
FIG. 6 is a block diagram showing an example of the management computer.

FIG. 6 is a diagram showing an example of the management computer 300. The management computer 300 has a CPU 310, a program memory 320, a hard disk drive 330, an output device 340, an input device 350, and a management interface 360, and these are respectively connected via a bus. The hardware configuration of the management computer 300 may be the same as a versatile computer (PC), for example. Incidentally, the input device 350 is specifically a keyboard, a mouse or the like. Further, the output device 340 is specifically a display device, such as a CRT or LCD or a video output device. Moreover, the management interface 360 is, for instance, a versatile communication device, such as the Ethernet. The program memory 320 is a magnetic storage system or a semiconductor storage system.

The program memory 320 stores programs and tables relating to the management of the storage system 1000. Specifically, the program memory 320 stores a data replication mode switch program 321, a management information I/O program 322, an I/O rate log table 323, a data replication buffer extent management table 324, a storage extent information table 325, and a data replication mode switch information table 326.

The management information I/O program 322 is a program executed by the CPU 310 upon transmitting and receiving management information between the management computer 300 and the storage system 1000.

The respective tables stored in the program memory 320 will be explained below.

FIG. 7 is a diagram showing an example of the I/O rate log table 323. The I/O rate log table 323 is the same as the I/O access information table 1419 of the storage system 1000. In other words, the I/O rate log table 323 registers information on the number of accesses from the host computer 100 for each storage extent 1110 of the storage system 1000. More specifically, the I/O rate log table, for each storage extent, has a field 3230 which registers an identifier of the storage extent and fields 3231 to 3233 which register information on the number of accesses for every certain fixed period. Based on this table, the management computer 300 is able to read the transition of the number of accesses from the past to the present. Here, the time interval for updating the information on the number of accesses may be different from the I/O access information table 1419.

FIG. 8 is a diagram showing an example of the data replication buffer extent management table 324. The data replication buffer extent management table 324 stores information concerning the buffer extent being used for the remote data replication in the respective storage systems. Specifically, the data replication buffer extent management table 324, for each storage extent 1110 subject that is to remote data replication, has a field 3240 which registers information of the identification number of the replication source storage system having such storage extent 1110, a field 3241 which registers information of the identification number of the storage extent 1110, a field 3242 which registers information on the used capacity of the data replication disk buffer extent 1130 to be used in the replication source storage system upon subjecting the data of such storage extent 1110 to remote data replication, a field 3243 which registers information on the used capacity of the data replication memory buffer extent 1220 to be used in the replication source storage system upon subjecting the data of such storage extent 1110 to remote data replication, a field 3244 which registers information of the identification number of the corresponding replication destination storage system, a field 3245 which registers information of the identification number of storage extent 1110, a field 3246 which registers information on the used capacity of the data replication disk buffer extent 1130 to be used in the replication destination storage system upon subjecting the data of such storage extent 1110 to remote data replication, and a field 3247 which registers information on the used capacity of the data replication memory buffer extent 1220 to be used in the replication destination storage system upon subjecting the data of such storage extent 1110 to remote data replication.

In FIG. 8, the storage extent 1110 having the identification number 00:00 for the storage system 1000 represented by the identification number 11000 and the storage extent 1110 having the identification number 00:02 for the storage system 2000 represented by the identification number 12000 are of a pair association; and, in the remote data replication to be executed in this pair association, the capacity of the data replication disk buffer extent 1130 assigned to this remote data replication in the data replication source storage system 11000 is 200 MB, and the capacity of the data replication disk buffer extent 1130 assigned to this remote data replication in the replication destination storage system 12000 is 200 MB.

FIG. 9 is a diagram showing an example of the storage extent information table 325. The storage extent information table 325 stores capacity information for each storage extent 1110 in the storage system 1000. Specifically, the storage extent information table 325 has, for each storage extent of the storage system 1000, a field 3250 which registers the identification number of the storage system 1000, a field 3251 which registers the identification number of the corresponding storage extent 1110, and a field 3252 which registers information on the storage capacity of such storage extent.

In FIG. 9, specifically, the capacity of the storage extent 1110 identified by the identification number 00:00 in the storage system the identification number 11000 is indicated as being 2000 MB. Incidentally, in order for the management computer 300 to acquire such information from the storage system 1000 and create a table, basically, the contents of the table will have to match information of the replication source storage extent capacity of the data replication configuration information table 1417.

FIG. 10 is a diagram showing an example of the data replication mode switch information table 326. The data replication mode switch information table 326 registers information concerning the standard at the time the management computer 300 instructs the storage systems 1000 and 2000 to switch the remote data replication mode. As described later, the management computer 300 compares the information registered in the data replication mode switch information table 326 and the information of the storage system 1000, and instructs the storage system 1000 or the like to change the remote data replication mode according to the results thereof.

The system administrator sets the standard for switching the remote data replication mode so that the resource of the system can be effectively utilized. For example, in the second asynchronous remote data replication, when a situation occurs where the frequency (rate) of use of the prepared data replication disk buffer extent decreases (or when such occurrence is expected), the mode is switched to another remote data replication mode, for instance, to the first asynchronous remote data replication mode. In the present embodiment, the usage rate of the data replication buffer extent is estimated based on the information of the access rate from the host computer 100 to the system, and a judgment as to the necessity of changing the remote data replication mode is determined thereby. Nevertheless, a standard based on other information (e.g., execution schedule of jobs in the host computer or information on the usage rate of resources collected by the storage system) may also be employed.

The administrator will create information on the switching standard of the remote data replication mode to be conducted by the storage system 1000 based on the configuration of the storage system 1000, for instance, information of the storage capacity of the storage extent or the information of the storage capacity of the cache memory 1200. And, the created information is registered in the data replication mode switch information table 326 via the input device 350 or management interface of the management computer 300.

Various remote data replication mode switching patterns may be considered. For example, switching between the synchronous remote data replication and asynchronous remote data replication (regardless of this being the first or second types described above), switching between the first asynchronous remote data replication and second asynchronous remote data replication, switching between the synchronous remote data replication and first asynchronous remote data replication, switching between the synchronous remote data replication and second asynchronous remote data replication, and so on, may be employed.

The administrator will register information in the data replication mode switch information table according to the remote data replication mode switching pattern to be executed.

In FIG. 10, as the judgment standard upon switching the remote data replication mode, an example is shown where a first threshold (hereinafter referred to as the "first switching threshold") and a second threshold (hereinafter referred to as the "second switching threshold") are set, and these are represented as the number of accesses per day. In this example, by setting two thresholds, a case of assuming that the storage system 1000 will execute the switching between the synchronous remote data replication and first asynchronous remote data replication, switching between the first asynchronous remote data replication and second asynchronous remote data replication, and switching between the synchronous remote data replication and second asynchronous remote data replication can be provided. Nevertheless, as another embodiment, a case of setting only one threshold in the data replication mode switch information table, and making the storage system 1000 execute the switching between the synchronous remote data replication and asynchronous remote data replication (either first or second) may be considered.

The data replication switch information table 326 of the present embodiment, for each storage extent 1110 subject to remote data replication, has a field 3260 which registers information of the identification number of such storage extent, and fields 3261 and 3262 which register information concerning the respective threshold, and a field 3263 which registers information concerning the period of duration.

As described above, in the present embodiment, since two thresholds are adopted, two fields which register information concerning the threshold are also prepared. Nevertheless, as described above, information concerning only one threshold may be registered in this field.

Further, the period of duration indicates the duration in which the access rate to the subject storage extent falls below or exceeds these thresholds. In the present embodiment, just because the access rate simply exceeds (or falls below) the threshold, this will not be judged as having satisfied the switching standard of the remote data replication mode, and only when the access rate continues to exceed (or fall below) the threshold to a certain degree will this be judged as satisfying the switching standard of the remote data replication mode. This is done to prevent the switching of the remote data replication from occurring frequently, which will occur if a case where the access rate temporarily exceeds the threshold is also subject to a change in the remote data replication mode. Nevertheless, in another embodiment, a case of giving no consideration to the period of duration, and instantaneously switching the remote access data replication mode when the access rate simply exceeds (or falls below) the set threshold may also be considered.

In the present embodiment, specifically, the management computer 300 controls the storage system 1000 to execute the second asynchronous remote data replication mode when the access rate exceeds the first switching threshold for a period longer than the period of duration, and to execute the first asynchronous remote data replication mode when the access rate falls below the first switching threshold. Further, the management computer 300 controls the storage system 1000 to execute the first asynchronous remote data replication mode when the access rate exceeds the second switching threshold for a period longer than the period of duration, and to execute the second asynchronous remote data replication mode when the access rate falls below the second switching threshold. Incidentally, information of the threshold may also be represented with an access rate per hour or an access rate per every 10 minutes. Further, the unit of the period of duration may also be hours or minutes.

An outline of the processing performed in this embodiment will now be explained. The system administrator or the like sets information in the management computer 300 beforehand regarding the standard for switching the remote data replication mode in the storage system 1000. Further, the administrator also sets information of the table that can be set at such point in time in the respective storage systems and the management computer 300. Incidentally, the administrator is not required at this point in time to set information which is to be acquired and set by the management computer 300 from the respective storage systems.

After the start of the system operation (including the execution of the remote data replication based on the initially set remote data replication mode), the management computer 300 acquires information regarding the access rate of the host computer 100 regarding the respective storage extents from the storage system 1000 at a prescribed timing, and updates the information of the I/O rate log table 323.

Further, the management computer 300 judges, at an arbitrary timing, whether the access rate to the storage extent relating to the individual remote data replications exceeds the standard (threshold in the present embodiment) registered in the data replication switching table 326. And, according to the judgment results, the management computer 300 instructs the storage system 1000 to change the remote data replication mode.

The storage system 1000 that has received instructions from the management computer 300 changes the remote data replication mode that is being executed according to such instructions. Here, the storage system 1000 also changes the allotment of resources pertaining to the change in the remote data replication mode (securement or release of the data replication disk (or memory) buffer extent). Then, the storage system 1000 executes remote data replication based on the switched remote data replication mode.

The flow of processing to be performed by the storage system 1000 and management computer 300 in the present embodiment will now be explained with reference to FIG. 11 and FIG. 12.

After the start of the system operation, the storage system 1000 executes the I/O monitoring program 1416 to collect the I/O rate from the host computer 100 to the storage extent 1110 in the storage system 1000 for each fixed period, and accumulates this information in the I/O access information table 1419 (step 1001). The management computer 300 periodically makes an inquiry to the storage system 1000 regarding the I/O access information (step 301).

The storage system 1000 receives the request for this I/O access information by executing the management information I/O program 1415 (step 1002), and transmits the information accumulated in the I/O access information table 1419 to the management computer 300 (step 1003).

The management computer 300 executes the management information I/O program 322 to receive the I/O access information transmitted from the storage system 1000 (step 302), and updates the I/O rate log table 323 based on such received information. Incidentally, at this point in time, the management computer 300 may output the updated I/O rate log table 323 and data replication buffer extent management table 324 to the output device 340. Output examples will be explained later (step 303).

Next, the management computer 300 executes the data replication switching program 321 to analyze the updated I/O rate log information, and judges whether to instruct the switching of the remote data replication mode. Incidentally, details of this analysis and judgment will be explained later (step 305).

When it is judged that instructions for switching the remote data replication mode will not be given, the management computer 300 will end the processing at this moment. When it is judged that instructions for switching the remote data replication mode will be given, the management computer 300 will execute the management information I/O program 322 and transmit the switching request of the remote data replication mode to the storage system 1000. This switching request message contains identification information of the storage extent 1110 that is subject to switching, and information concerning the remote data replication mode after switching and the allocation of resources after the switching (redistribution of buffer) (step 307).

When the storage system 1000 receives the switching request (step 1004), the storage system 1000 starts the data replication mode switching processing. Incidentally, details regarding the data replication mode switching processing will be explained later (step 1005). After switching the remote data replication mode with the data replication mode switching processing, the storage system 1000 transmits a switch completion notice to the management computer 300 (step 1006).

The management computer 300 receives the switch completion notice (step 308), and updates the data replication buffer extent management table 324 (step 309). Thereafter, the management computer 300 outputs the switching results to the output device 340 (step 310).

Next, an example of the detailed procedures of the processing to be performed at step 305 will be explained. By executing the data replication mode switching program 321 at step 305, the management computer 300 is able to monitor the changes in the access rate to the storage extent 1110 in the storage system 1000, and to determine the switching instructions of the remote data replication mode and create information on the redistribution of the buffer extent according to the results of such monitoring.

Figure 13:
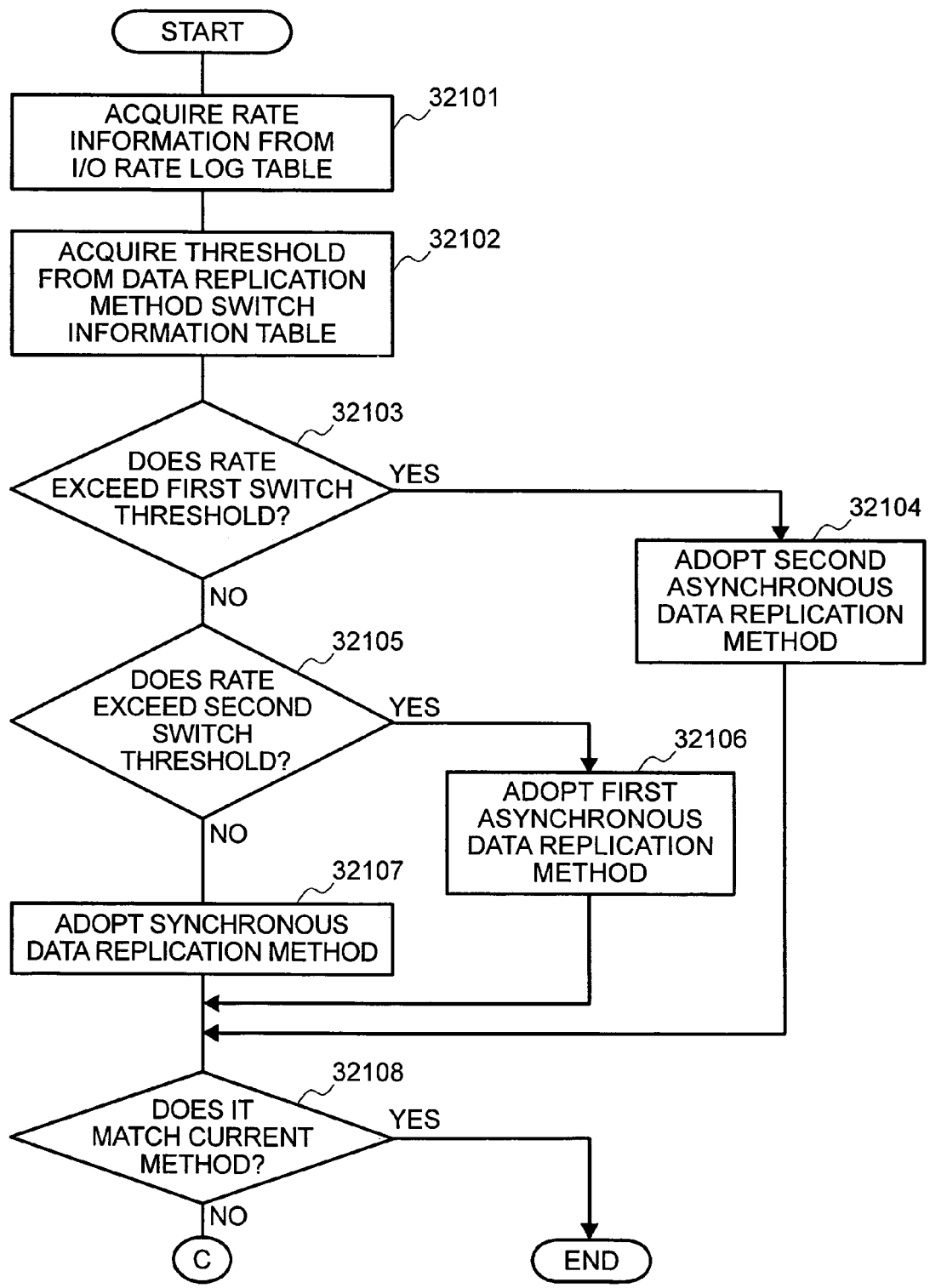
FIG. 13 is a flowchart showing an example of processing of the switch determination of the data replication mode.
Figure 14:
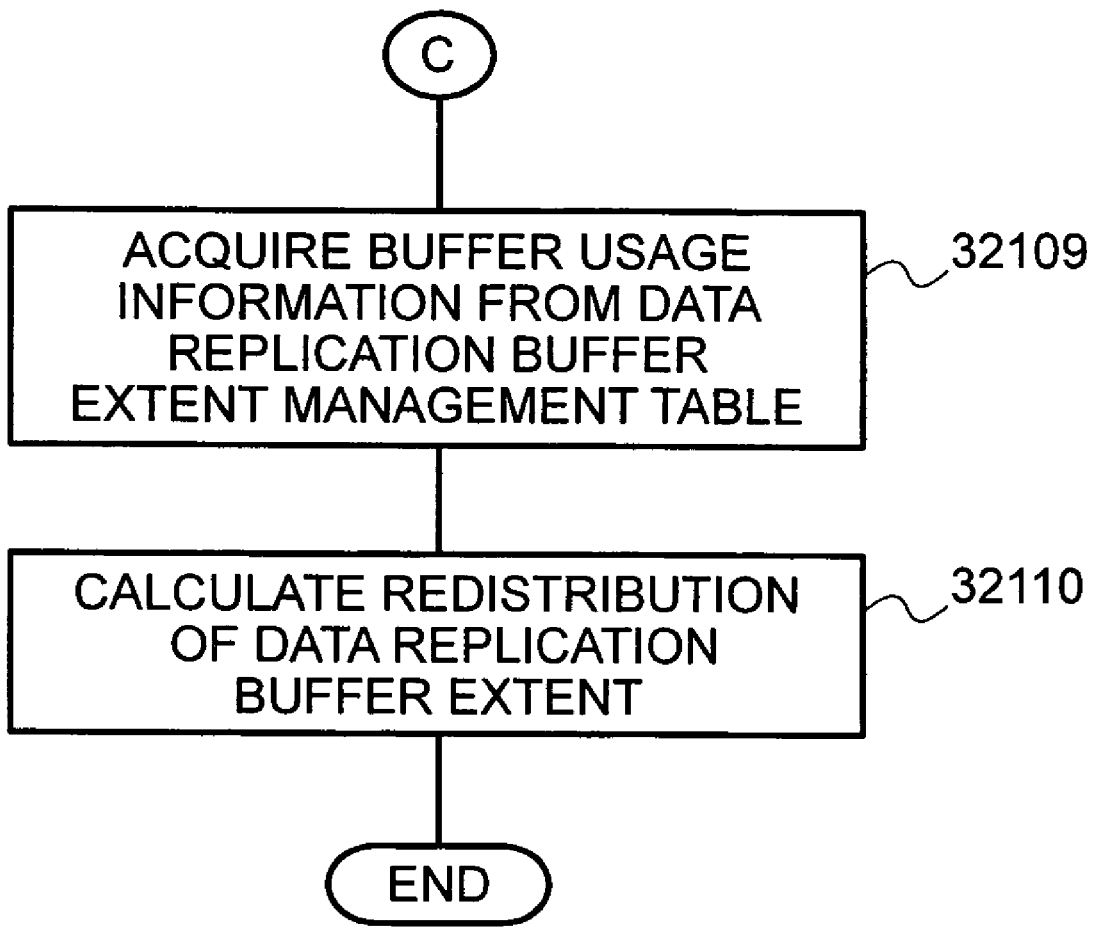
FIG. 14 is a flowchart showing an example of processing of the switch determination of the data replication mode.

FIG. 13 and FIG. 14 are diagrams showing procedural examples of the processing performed at step 305. The management computer 300, foremost, acquires I/O rate information form the I/O rate log table 323 for every certain fixed period (step 32101). Next, the management computer 300 acquires information concerning the switching threshold from the data replication mode switch information table 326 (step 32102).

Thereafter, the management computer 300 compares the information regarding the threshold and the information concerning the access rate that it acquired. Foremost, the management computer 300 compares the first switching threshold with the access rate (step 32103). When the I/O access rate for each storage extent 1110 acquired at step 32101 exceeds the first switching threshold continuously for a period longer than the set period of duration, the management computer 300 judges that it is necessary to instruct the storage system 1000 to change to the second asynchronous remote data replication mode (step 32104).

Meanwhile, when the access does not exceed the first switching threshold continuously for a period longer than the set period of duration, the management computer 300 compares the second switching threshold and the access rate of the storage system 1000 (step 32105). When the I/O access rate exceeds the second switching threshold continuously for a period longer than the set period of duration, the management computer 300 judges that it is necessary to instruct the storage system 1000 to change to the first asynchronous remote data replication mode (step 32106).

Meanwhile, when the access does not exceed the second switching threshold continuously for a period longer than the set period of duration, the management computer 300 judges that it is necessary to instruct the storage system 1000 to change to the synchronous remote data replication mode (step 32107).

Thereafter, the management computer 300 judges whether the remote data replication mode to be executed after the change coincides with the current remote data replication mode (step 32108). When remote data replication mode to be executed after the change coincides with the current remote data replication mode of the storage system 1000, since it is not necessary to instruct a change of the data replication mode, the management computer 300 will end the processing.

Meanwhile, when the remote data replication mode to be executed after the change does not coincide with the current remote data replication mode, the management computer 300 acquires information regarding the usage status of the buffer extent from the data replication buffer extent management table 324 (step 32109), calculates the redistribution of the data replication buffer extent, and ends the processing (step 32110).

Here, the redistribution of the data replication buffer extent includes a release of the data replication buffer extent that is no longer used as a result of the remote data replicate mode being switched, and processing for creating information for instructing the storage system 1000 to allocate the data replication buffer extent to be newly used. The amount of allocation of the data replication disk buffer extent 1130, for example, will be determined based on the Formula 1 indicated below:

Allocation capacity=storage extent capacity×distribution coefficient     Formula 1

Here, "allocation capacity" refers to the storage capacity of the disk buffer allocated to the storage extent 1110 in which the mode is to be changed to the second asynchronous remote data replication mode. Further, "storage extent capacity" corresponds to the storage capacity of the storage extent 1110 stored in the storage extent information table 325 illustrated in FIG. 9. "Distribution coefficient" is a coefficient for determining how much capacity of the disk buffer extent 1130 should be allocated to the storage extent capacity. For instance, if the distribution coefficient is set to 0.1, since the capacity of the storage extent 1110 represented by the identification number 00:00 depicted in FIG. 9 is 2000 MB, when the data replication mode for the data stored in this storage extent is to be changed to the second asynchronous data replication mode, 200 MB of data replication disk buffer extent 1130 will be allocated.

Similarly, the allocation amount of the data replication memory buffer extent 1220, for example, will be determined by the following formula:

Allocation capacity [MB]=64 (n≦4)=     Formula 2(a)

(Maximum capacity of data replication memory buffer extent)÷n (n>4)     Formula 2(b)

Here, n is the quantity of the storage extents 1110 subject to the first asynchronous remote data replication mode in the storage system 1000. Further, the "maximum capacity of data replication memory buffer extent" is the maximum capacity that the data replication memory buffer area 1220 in the cache memory 1200 is able to obtain. For instance, let it be assumed that the maximum capacity of the data replication memory buffer extent 1220 is 256 MB. When there are two storage extents 1110 subject to the first asynchronous remote data replication, based on Formula 2(a), the allocation amount of the data replication memory buffer extent for each storage extent 1110 will be calculated as 64 MB. Meanwhile, when there are eight storage extents 1110 subject to the first asynchronous remote data replication, based on Formula 2(b), the allocation amount of the data replication memory buffer extent 1220 for each storage extent 1110 will be calculated as 32 MB. Nevertheless, other methods may be used for calculating the distribution amount of the data replication disk buffer extent 1130 and the data replication member buffer extent 1220.

Figure 15:
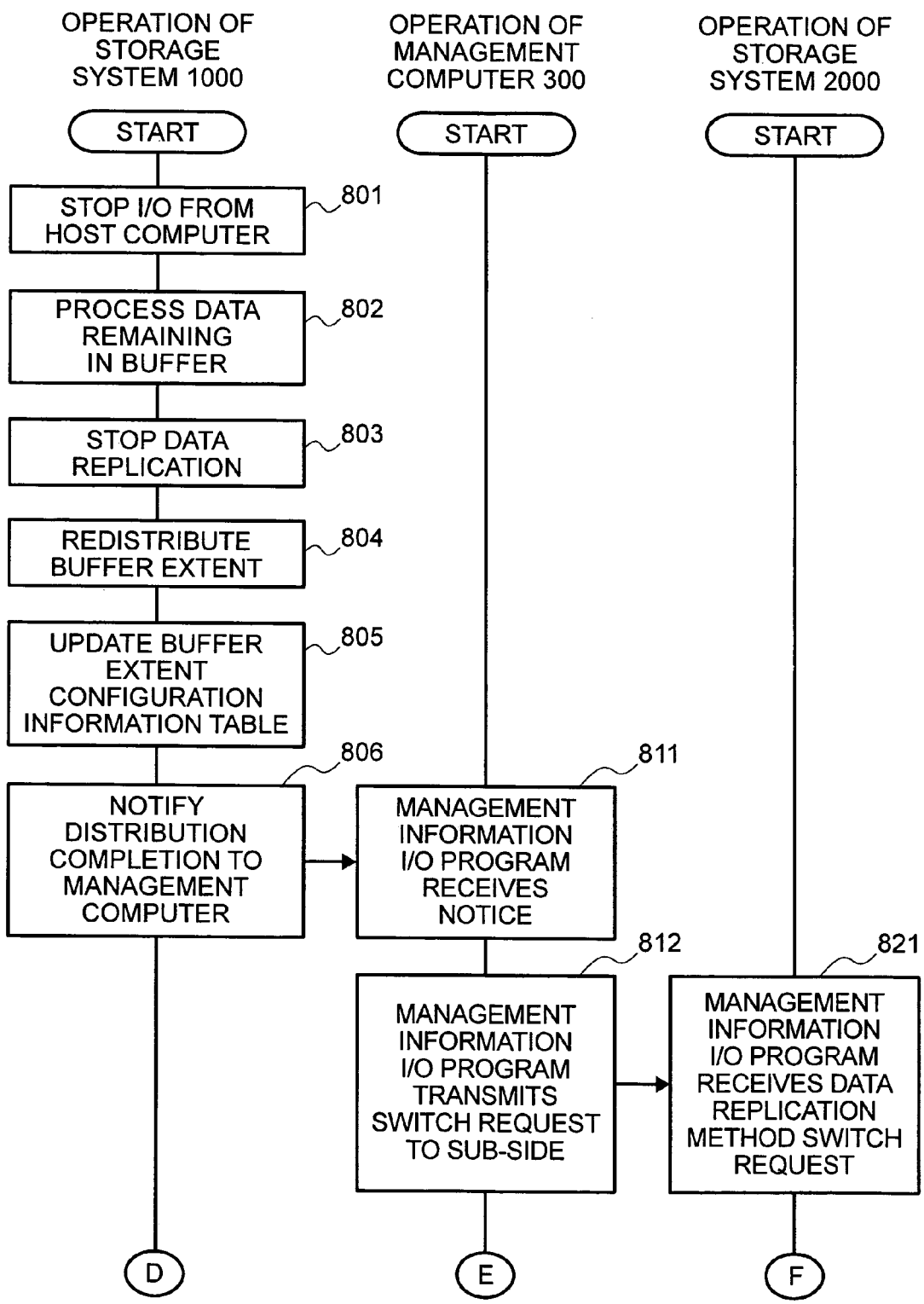
FIG. 15 is a flowchart showing an example of processing of the switching of the data replication mode.
Figure 16:
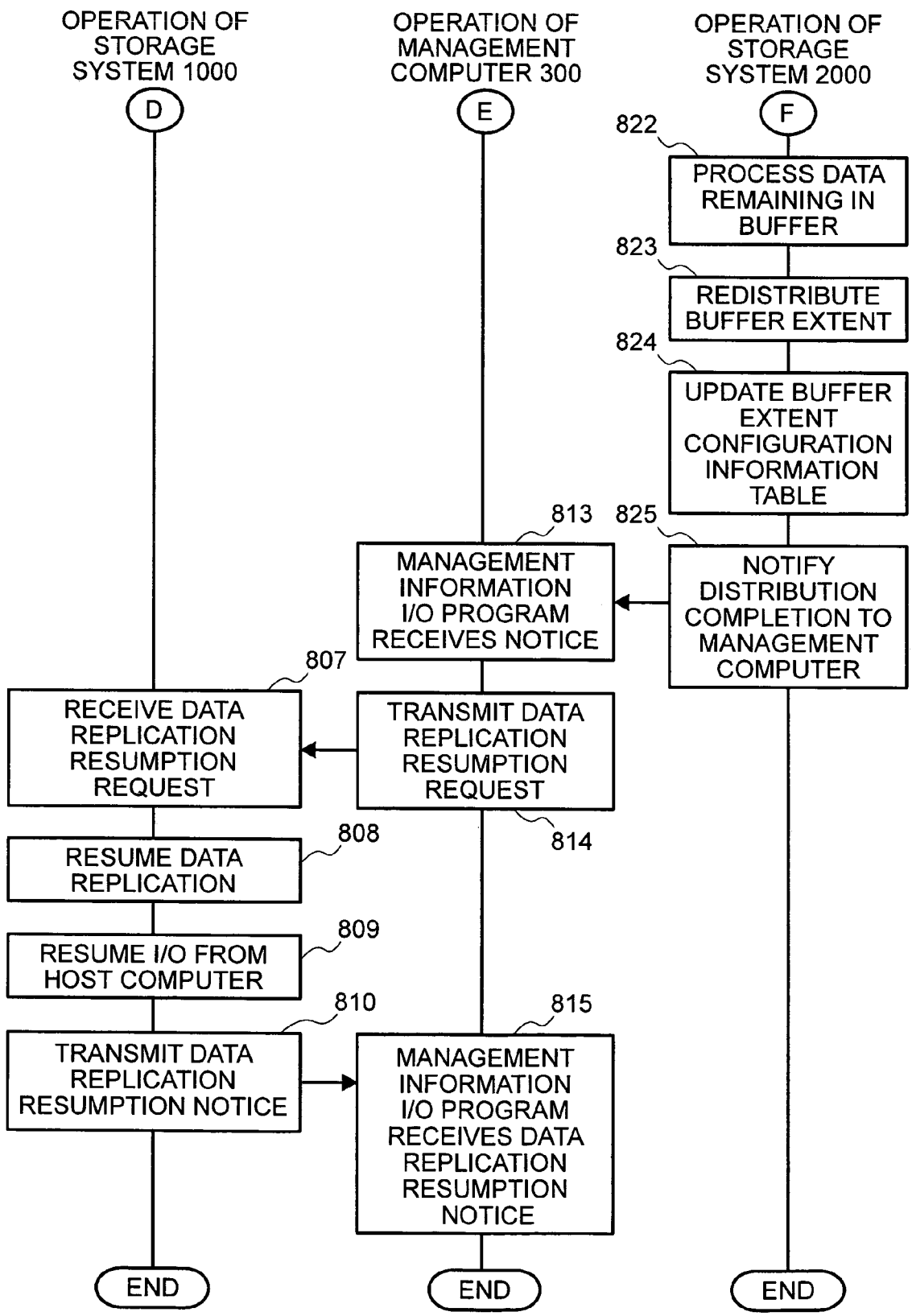
FIG. 16 is a flowchart showing example of the processing of the switching of the data replication mode.

Next, procedural examples of the remote data replication mode switching to be conducted by the storage system 1000 or the like at step 1005 will now be explained with reference to FIG. 15 and FIG. 16.

The storage system 1000 that started the data replication mode switching processing will temporarily stop the input/output operations from the host computer 100 (step 801). When there is unprocessed data remaining in the data replication disk buffer extent 1130 or the data replication memory buffer extent 1220, the storage system 1000 processes such unprocessed data. For example, when there is data that has not been forwarded to the replication destination storage system, the storage system 1000 completes the forwarding of such data, and clears the data replication buffer extent of any data (step 802).

When the data replication buffer extent becomes empty, the storage system 1000 executes the data replication control program 1414 to stop the remote data replication. Here, the storage system 1000 temporarily stops the data transfer while maintaining the pair association of the storage extents 1110 of the source and replication destination storage systems (step 803).

Next, the storage system 1000 conducts a redistribution of the data replication disk buffer extent 1130 or the data replication memory buffer extent 1220 based on the information transmitted from the management computer 300. The redistribution amount of the buffer extent is calculated by the management computer 300 in advance, and it is conducted according to the request from the management computer 300. This redistribution processing includes changing the release or allocation capacity of the data replication memory buffer extent 1220, changing the release or allocation capacity of the data replication disk buffer extent 1130, newly allocating the data replication memory buffer extent 1220, newly allocating the data replication disk buffer extent 1130, and so on (step 804).

When the redistribution of the data replication buffer extent is completed, the storage system 1000 updates the buffer configuration information table 1418 according to the buffer configuration after the switch has occurred (step 805). After the update or the buffer configuration information table 1418 is completed, the storage system 1000 notifies the management computer 300 of the completion of distribution (step 806).

When the management computer 300 receives the notice indicating that the redistribution of the buffer extent has been completed (step 811), it then transmits the switching request of the data replication mode to the storage system 2000 (step 812). This switching request message contains identification information of the storage extent in the replication source storage system that is subject to switching, and information regarding the redistribution amount of the data replication buffer extent.

The storage system 2000 receives the switching request message from the management computer 300 (step 821), and it performs the processing of unprocessed data remaining in the data replication disk buffer extent 1130 or the data replication memory buffer extent 1220 in the storage system 2000 (step 822). Thereafter, in the same manner as the processing with the storage system 1000 (step 804), the storage system 2000 conducts the redistribution of the buffer extent according to the switching request from the management computer 300 (step 823).

After the redistribution of the buffer extent is completed, the storage system 2000 updates the buffer configuration information table 1418 that it possesses according to the buffer configuration which exists after the switching (step 824). After the update of the buffer configuration information table 1418, the storage system 2000 sends a notification to the management computer indicating that the redistribution is complete (step 835).

The management computer 300 receives the buffer extent redistribution notice from the storage system 2000 (step 813). Thereafter, the management computer 300 transmits the data replication resumption request to the storage system 1000 (step 814). The storage system 1000 receives the data replication resumption request (step 807) and starts the remote data replication based on the remote data replication mode instructed to be changed in the designated pairs of the storage extents 1110 (step 808). Thereafter, the storage system 1000 resumes the input/output operations from the host computer 100 to the storage extent 1110 of the storage system 1000 (step 809). Thereafter, the storage system 1000 transmits a data replication resumption notice to the management computer 300 (step 810).

The management computer 300 receives the data replication resumption notice from the storage system 1000, and it terminates the data replication mode switching processing.

Figure 17:
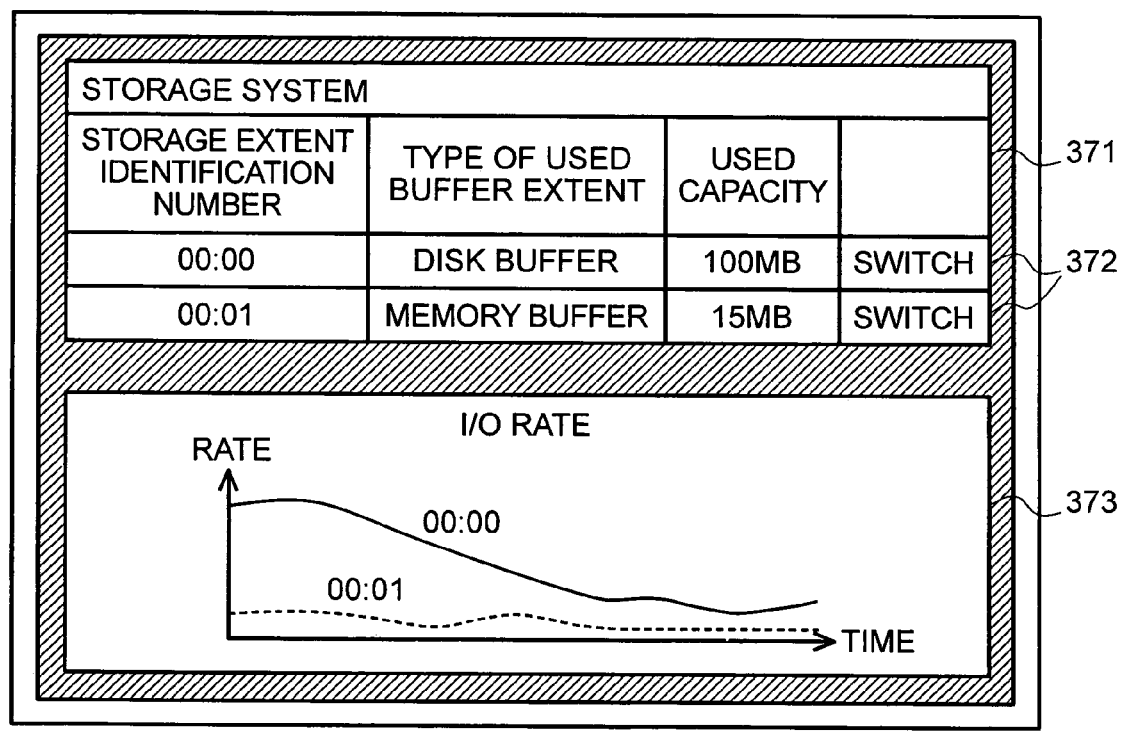
FIG. 17 is a diagram showing an example of the output of the storage system management information.

FIG. 17 is a diagram showing an example where the management computer 300 outputs to the screen of the output device 340 information in the I/O rate log table 323 and the data replication buffer extent management table 324. In FIG. 17, there is displayed, in area 371, the identification number of the storage extent 1110 in the storage system 1000, as well as the type and used capacity of the data replication buffer extent used by the respective storage extents 1110. Further, there is displayed, in area 373, an easy-to-understand transition (for example in a line chart) of the I/O rate from the host computer 100 to the storage extent 1110 in the storage system 1000.

Incidentally, the administrator having the authority to judge the switching of the remote data replication mode may also judge whether to conduct switching, on behalf of the management computer 300, based on such output results. For instance, as shown in area 372 in FIG. 17, a button may be provided for use to produce switching when being on the screen.

Figure 18:
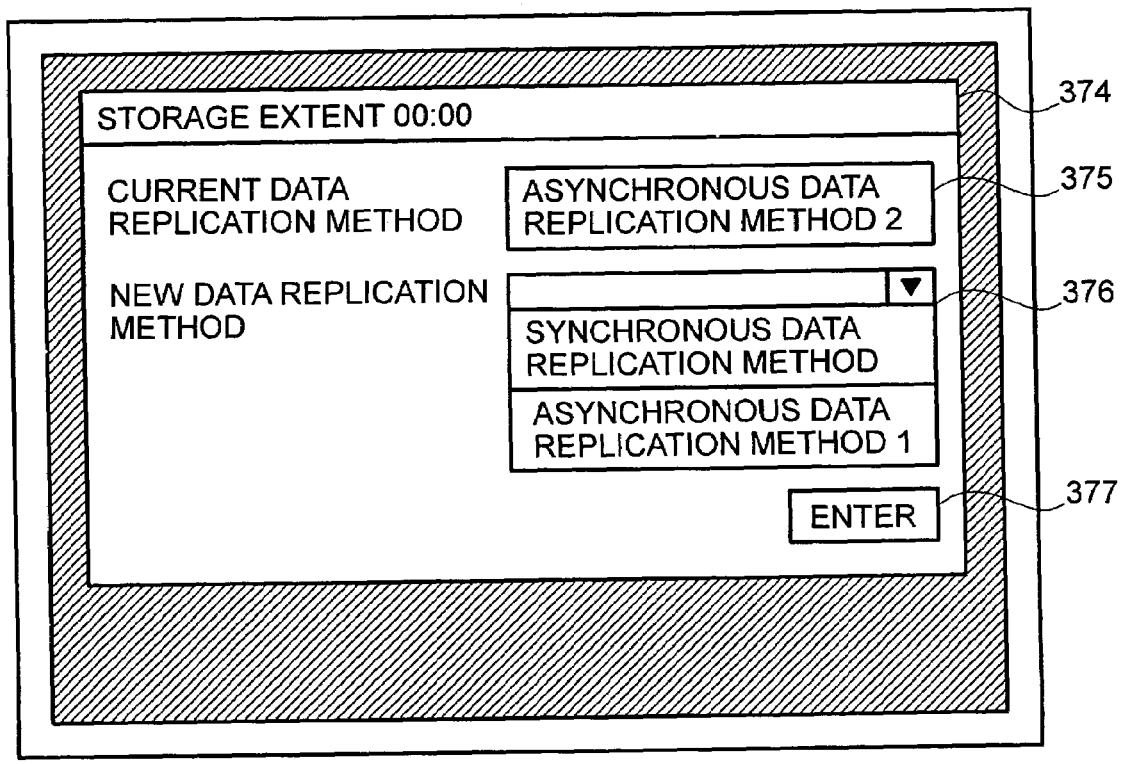
FIG. 18 is a diagram showing an example of the screen output for use by the administrator to manually switch the data replication mode.

FIG. 18 is a diagram showing a screen for switching the data replication mode. In the screen for conducting the switch, the management computer 300 displays area 375 for displaying the current remote data replication mode of the storage extent 1110, area 376 for displaying the options of the remote data replication mode to be changed, and area 374 having a button 377 for executing the data replication mode switch. When the administrator selects the remote data replication mode to be switched in area 376 and clicks the button 377 for entering such selection content, data stored in the storage extent 1110 represented by the identification number 00:00 is subject to remote data replication based on the selected remote data replication mode.

For example, in the I/O access information table 1419 illustrated in FIG. 4 and the I/O rate log table 323 depicted in FIG. 7, the number of accesses, for the day before, to the storage extent 1110 (subject to the second asynchronous remote data replication at this point) represented by the identification number 00:00 is 50 accesses, and the number of accesses for the current day is 30 accesses, indicating that the number of accesses fell below the second switching threshold for two consecutive days. Therefore, the management computer 300 judges that switching to the synchronous remote data replication mode is necessary, and it transmits to the storage system 1000 a switching request from the second asynchronous remote data replication mode to the synchronous remote data replication mode.

Since the remote data replication based on the synchronous remote data replication modes does not use a data replication buffer extent, as a result of the switching processing arising from this switching request, the 200 MB of storage capacity of the data replication disk buffer extent 1130 that was being used in the remote data replication based on the second asynchronous remote data replication mode conducted between storage extents 1110 will be released, and the released storage capacity may be used as a separate storage extent 1110 in the hard disk drive 1100, or as a buffer extent of remote data replication between different storage extent pairs.

Incidentally, in the present embodiment, although a case was explained where the storage system 1000 was able to execute the remote data replication based on all remote data replication modes, the present embodiment can be executed regardless. For example, when the storage system 1000 is only able to execute the synchronous remote data replication and the first (or second) asynchronous remote data replication, the administrator sets the switching standard of these two remote data replication modes in consideration of the effective use of the data replication memory buffer extent. This is the same when the storage system 1000 is only able to execute the first and second asynchronous remote replications.

Embodiment 2

Figure 19:
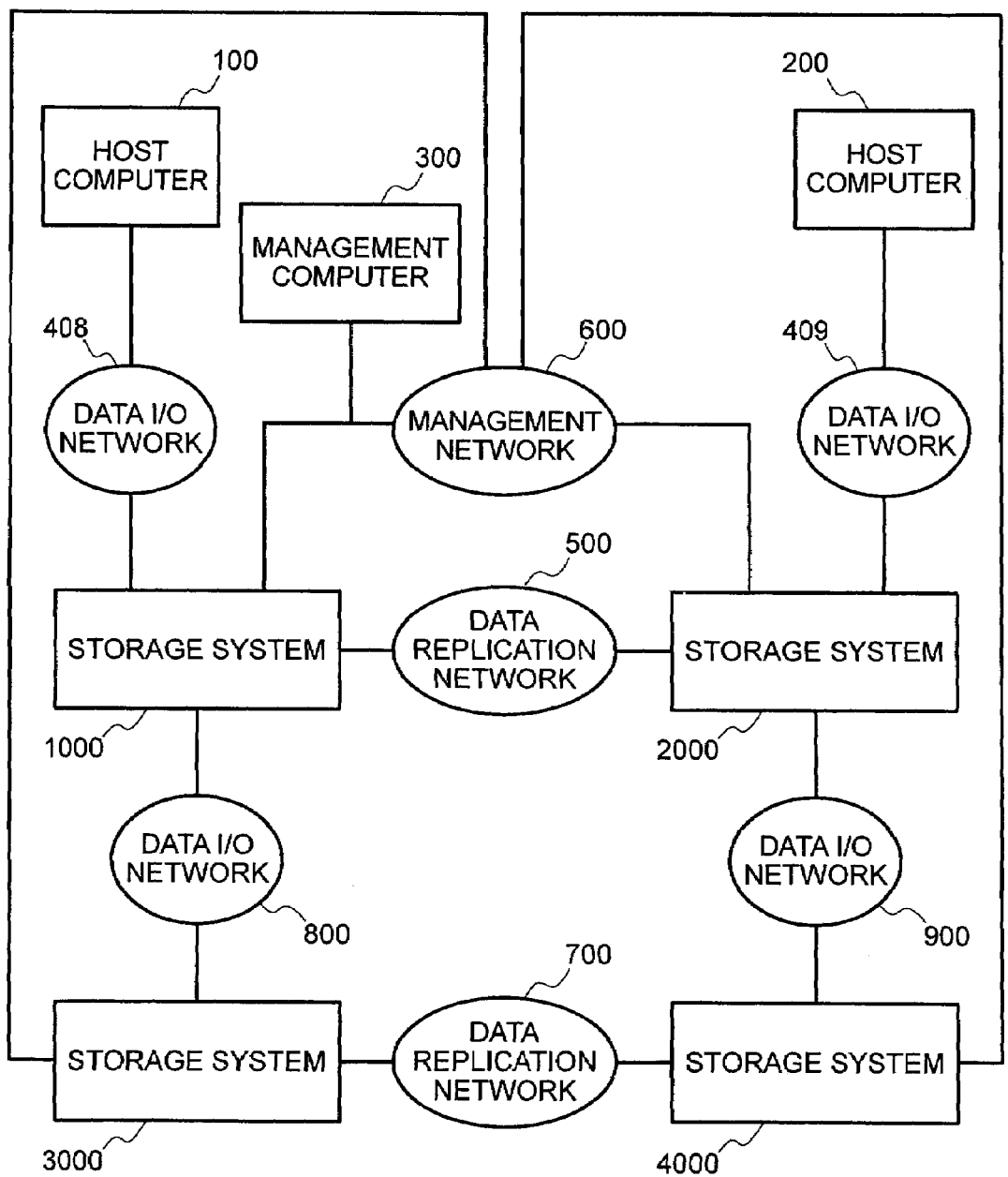
FIG. 19 is a block diagram showing an example of the computer system according to the second embodiment of the present invention.

FIG. 19 is a diagram showing an example of the system according to a second embodiment. In the present embodiment, in addition to the configuration of the first embodiment, a storage system 3000 to be connected to the storage system 1000 and a storage system 4000 to be connected to the storage system 2000 have been added. The storage system 3000 is connected to the storage system 1000 via a data I/O network 800. Similarly, the storage system 4000 is connected to the storage system 2000 via a data I/O network 900. Further, the storage system 3000 and storage system 4000 mutually communicate via a data replication network 700.

The data I/O networks 800, 900 and the data replication network 700 may be configured, as with the data replication network 500 explained in connection with the first embodiment, from a standard network connection mode, such as a fibre channel or Ethernet. Further, the data replication network 500 and data replication network 700 may be physically the same. Moreover, the data I/O network 800 may be physically identical to the data I/O network 408. Similarly, the data I/O network 900 may be physically identical to the data I/O network 409. The management computer 300 in the present embodiment manages information concerning the remote data replication of the storage system 1000, storage system 2000, storage system 3000 and storage system 4000. The management computer 300 is connected to the storage system 3000 and storage system 4000 via a management network 600.

Figure 20:
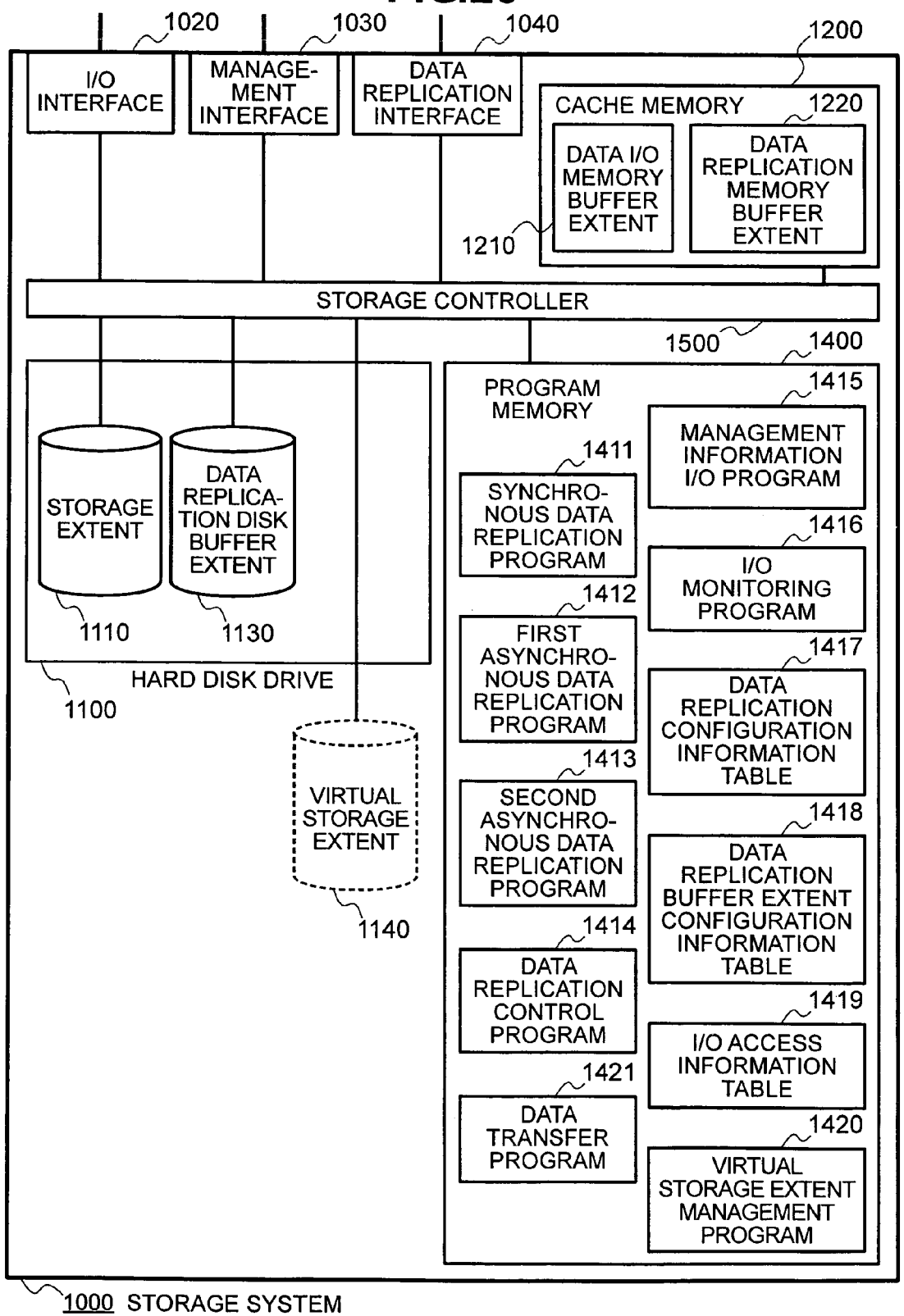
FIG. 20 is a diagram showing an example of the storage system used in the computer system of FIG. 19.

FIG. 20 is a diagram showing an example of the storage system 1000 in the present embodiment. The storage system 1000 of this embodiment, in addition to the configuration of the first embodiment, has a virtual storage extent 1140. It further has a virtual storage extent management program 1420 and a data transfer program 1421 in the program memory 1400. An interface similar to the data I/O interface 1020 can be used for the connection between the storage system 1000 and the storage system 3000. Further, the configuration of the storage system 2000 is the same as the configuration of the storage system 1000 of the present embodiment.

Here, "virtual storage extent" indicates a storage extent created by the storage system 1000 based on a recording medium that it does not have (hard disk drive of the storage system 3000 in the present embodiment). The host computer 100 handles the storage extent 1110 and the virtual storage extent 1140 equally as the "storage extent of the storage system 1000". Upon receiving instructions to store data in the virtual storage extent 1140, the storage system 1000 transfers such data to the storage system (storage system 3000 in this case) which manages the recording medium that it does not have.

The data transfer program 1421 is executed with the storage controller 1500 upon transferring the data stored in the storage extent 1110 in its own storage system containing the virtual storage extent 1140 to a different storage extent 1110 in its own storage system containing the virtual storage extent 1140. For example, the storage controller 1500 transfers the data stored in the storage extent 1110 belonging to the storage system 1000 to the virtual storage extent 1140 of the storage system 1000 physically belonging to the storage system 3000 (data transfer to the memory system 3000 in this case).

The virtual storage extent 1140 management program 1420 is a program executed by the storage controller 1500 upon managing the virtual storage extent in its own storage system. For example, the storage controller 1500 performs processing, such as the addition or deletion of the virtual storage extent 1140. Further, the information concerning the changed virtual storage extent configuration is transmitted to the management computer 300 via the management network 600.

The configuration of the storage system 3000 and the storage system 4000 may be the same as the configuration of the storage system 1000 illustrated in FIG. 2. An interface similar to the data replication interface 1040 is used as the communication interface of the data replication network 700 for connecting the storage system 3000 and the storage system 4000.

Figure 21:
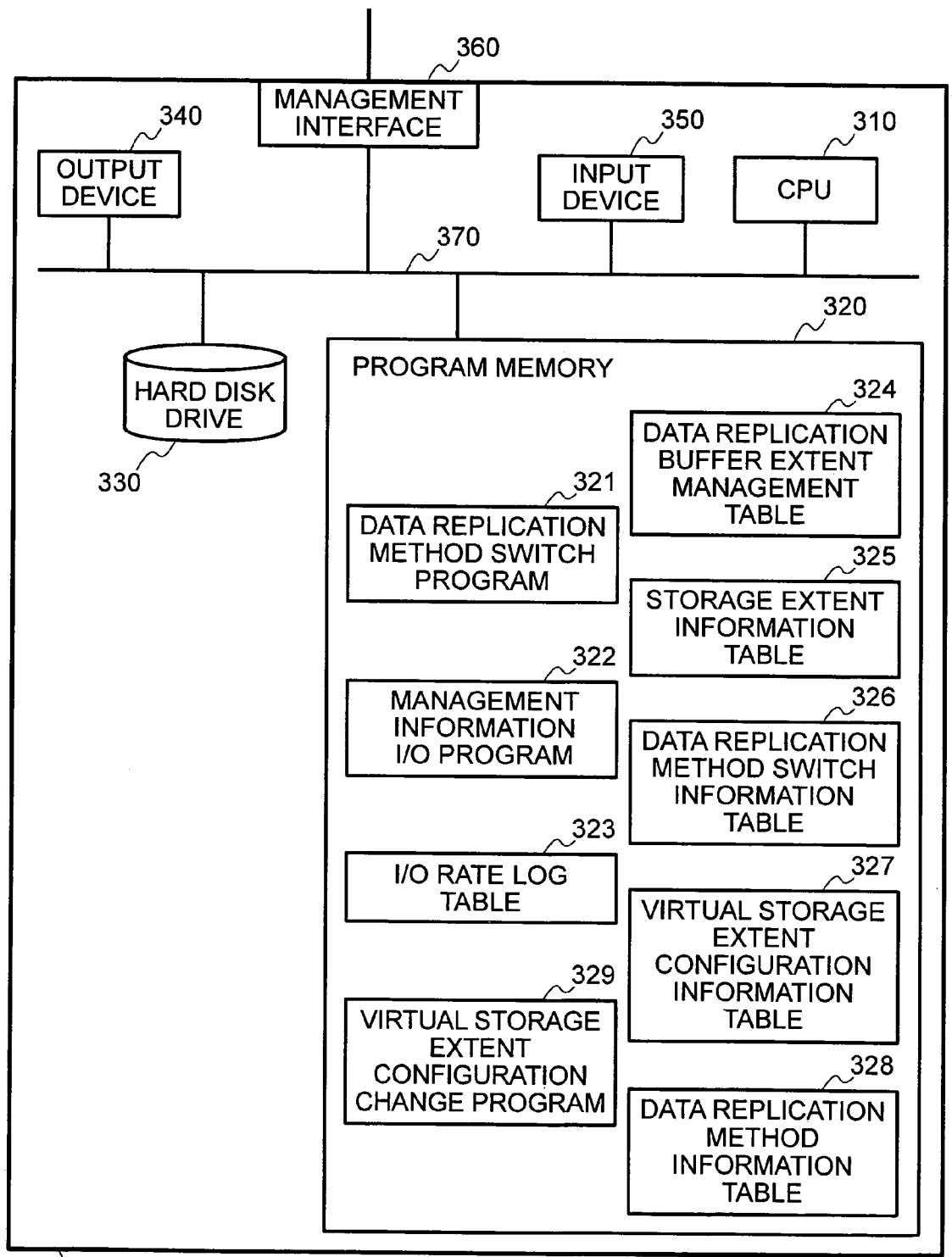
FIG. 21 is a block diagram showing an example of the management computer.

FIG. 21 is a diagram showing an example of the management computer 300 in the present embodiment. The management computer 300 of this embodiment has, in addition to the configuration of the management computer 300 of the first embodiment, a virtual storage extent configuration information table 327, a data replication mode information table 328 and a virtual storage extent configuration change program 329 in the program memory 320.

The virtual storage extent configuration information table 327 registers configuration information of the virtual storage extent 1140 of the storage system 1000 or the storage system 2000. FIG. 22 is a diagram showing an example of the virtual storage extent configuration information table 327. Specifically, the virtual storage extent configuration information table 327 has, for each virtual storage extent, a field 3270 which registers the identification number of the storage system managing the virtual storage extent, a field 3271 which registers the identification information of the corresponding virtual storage extent, a field 3272 which registers the identification information of the storage system to which the corresponding virtual storage extent 1140 physically belongs, a field 3273 which registers identification information of the storage extent corresponding to the virtual storage extent, and a field 3274 which registers information on the capacity of the virtual storage extent.

In FIG. 22, an example is shown where the virtual storage extent 1140 having of the identification information 04:01 for the storage device 1000 represented by the identification information 11000 is physically the storage extent 1110 (identification information 01:01) in the storage device 3000 represented by the identification information 13000, and the capacity thereof is 2000 MB.

The data replication information table 328 stores the data replication program information held by the respective storage systems. In other words, the data replication information table 328 stores, for each storage system, information concerning the remote data replication mode that is executable by the storage system.

FIG. 23 is a diagram showing an example of the data replication mode information table 328. Specifically, the data replication mode information table 328 has, for each storage system, a field 3280 which registers the identification number of the corresponding storage system, and a field 3281 which registers the information regarding the type of data replication mode executable by the corresponding storage system. In FIG. 23, an example is shown where the storage system 1000 represented by the identification information 11000 is able to execute remote data replication with the first asynchronous remote data replication mode and second asynchronous remote data replication mode.

In the present embodiment, the management computer 300 confirms, upon judging the switching of the remote data replication, whether the storage system executing the remote data replication subject to judgment is able to execute the remote data replication after switching. And, when the execution of the remote data replication mode after switching is not possible, the management computer 300 confirms where another storage system connected to this storage system is able to execute the remote data replication mode after switching. When there is such a storage system, the management computer 300 controls the system such that the storage system capable of executing the remote data replication after switching executes the remote data replication after switching in place of the storage system that was executing the remote data replication. Here, if necessary, data is transferred between such storage systems.

Figure 12:
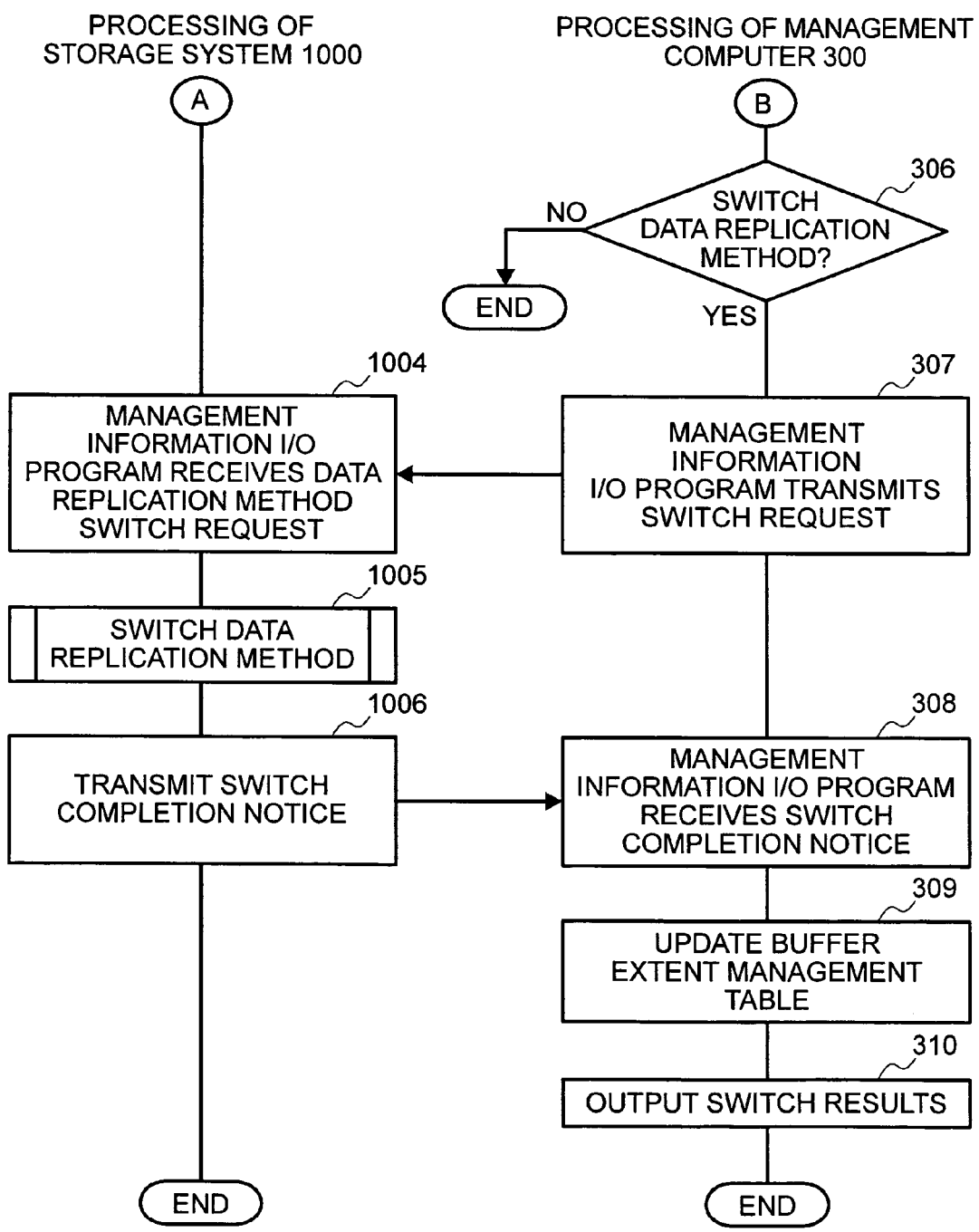
FIG. 12 is a flowchart showing an example of processing pertaining to the switching of the data replication mode.

The flow of processing to be performed by the management computer and storage system 1000 in the present embodiment is basically the same as the flowchart shown in FIG. 11 and FIG. 12. Nevertheless, step 307, step 308 and steps 1004 to 1007 illustrated in FIG. 12 are replaced by the processing steps described below.

Figure 24:
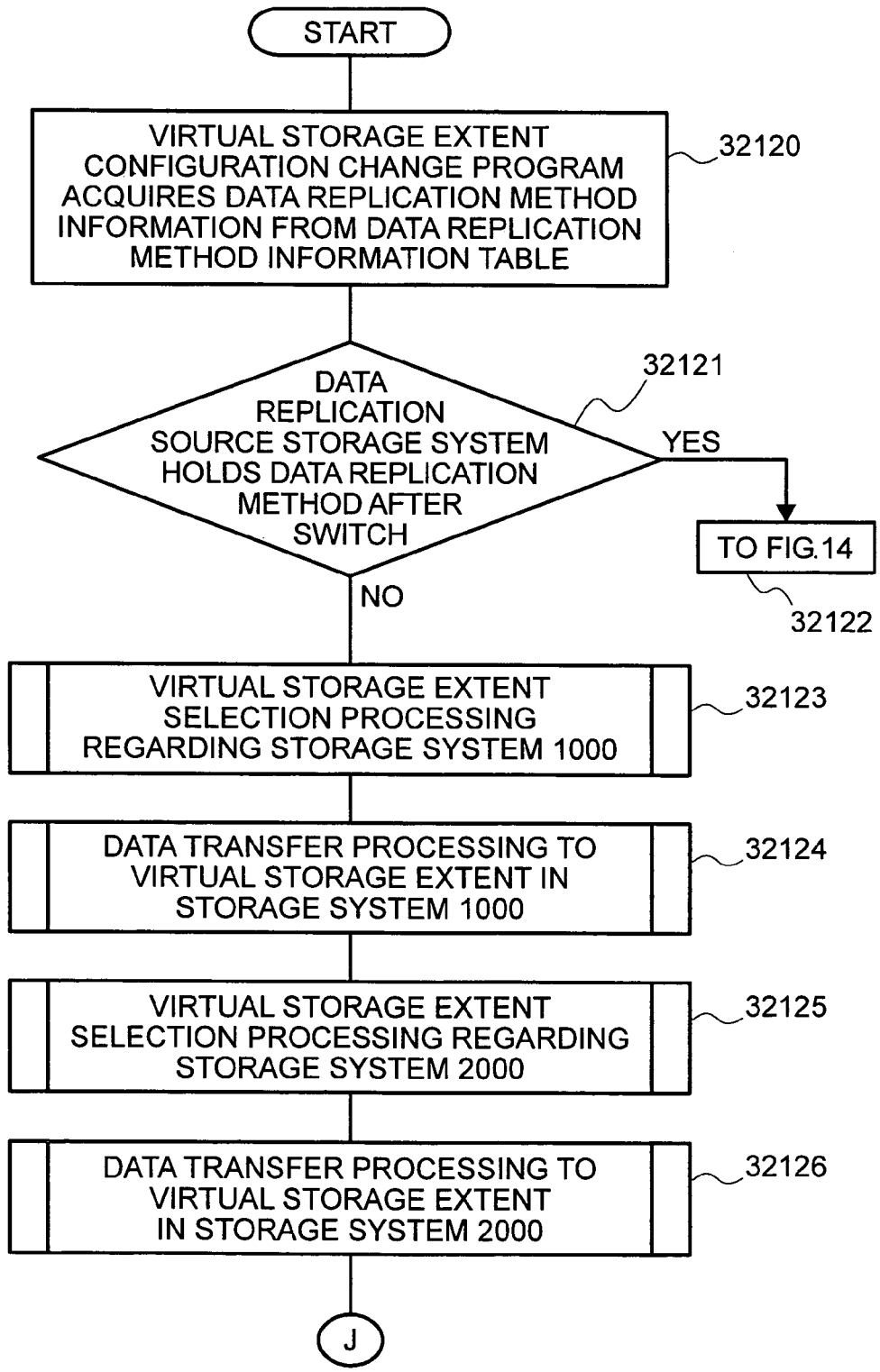
FIG. 24 is a flowchart showing an example of the processing pertaining to the switching of the data replication mode.
Figure 25:
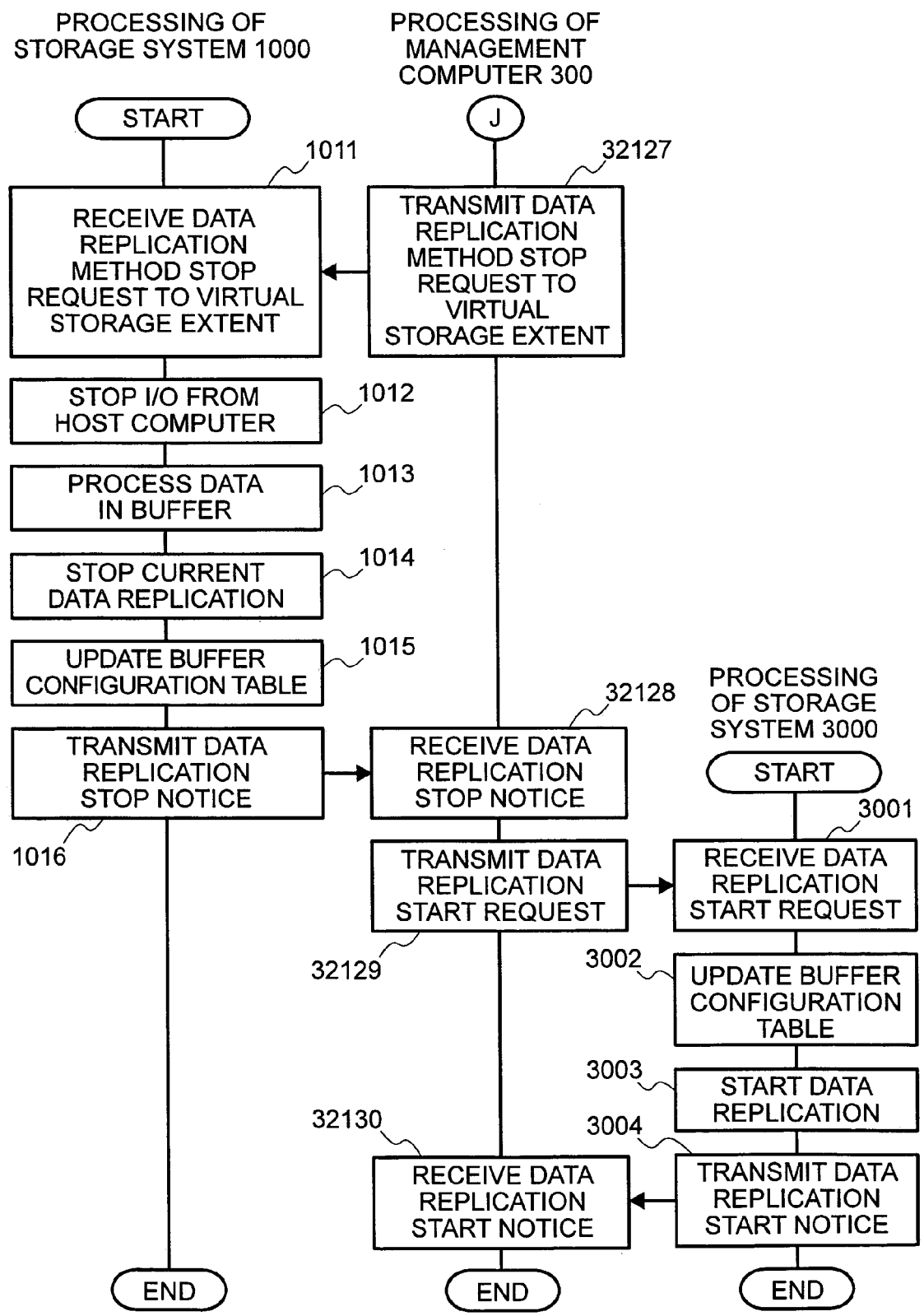
FIG. 25 is a flowchart showing an example of processing pertaining to the switching of the data replication mode.

FIG. 24 and FIG. 25 are diagrams showing the procedural examples of the processing to be performed by the storage system and management computer 300 instead of step 307, step 308 and steps 1004 to 1007 in FIG. 12. The management computer 300 that judges the necessity for switching the remote data replication mode at step 306 shown in FIG. 12 acquires information from the data replication mode information table 328 regarding the remote data replication mode that can be executed by the storage system that is executing the remote data replication subject to remote data replication switching (step 32120). Based on this information, the management computer 300 judges whether the storage system 1000 to which the storage extent 1110 subject to remote data replication (hereinafter also referred to as the "replication source storage extent") is able to execute the remote data replication mode after switching (step 32121).

As a result of such judgment, when the storage system 1000 is able to execute the remote data replication mode after switching, processing that is similar to the switching processing illustrated in FIG. 13 is executed in the respective systems (step 32122). Meanwhile, when the storage system 1000 is not able to execute the remote data replication mode after switching, the management computer 300 selects a storage system that is capable of realizing the remote data replication mode after switching and is capable of providing a storage extent that is to become the virtual storage extent to the storage system 1000. And, the management computer 300 selects the data stored in the replication source storage extent 1110 to be transferred among the virtual storage extents provided to the storage system 1000 by the selected storage system. Details of this processing will be explained later (step 32123).

Next, the management computer 300 instructs the storage system 1000 having the replication source storage extent 1110 to execute the data transfer processing from the replication source storage extent 1110 to the virtual storage extent 1140 selected at the previous step. The storage system 1000 which received the instruction performs the data transfer processing. Details of this processing will be explained later (step 32124).

After the data transfer in the storage system 1000 is completed, the management computer 300 selects a storage system that is capable of executing the remote data replication mode after switching and is capable of providing a storage extent that is to become the virtual storage extent to the storage system 2000. And, the management computer 300 selects the storage extent 1140 (hereinafter also referred to as the "replication destination storage extent") in a pair association with the replication source storage extent to be transferred among the virtual storage extents 1140 that the selected storage device provides to the storage system 2000 (step 32125).

Thereafter, the management computer 300 instructs the storage system 2000 to transfer the data stored in the replication destination storage extent. The storage system 2000 that received the instruction performs the data transfer processing from the replication source storage extent 1110 to the virtual storage extent 1140 selected at the previous step (step 32126).

After the data transfer from the replication source storage extent 1110 to the virtual storage extent 1140 is completed in the storage system 1000, the management computer 300 transmits a request to the storage system 1000 for stopping the remote data replication. This message contains the identification information of the replication source storage extent 1110 associated with the remote data replication to be stopped (step 32127).

The storage system 1000 receives the remote data replication stop request (step 1011), and temporarily stops the input/output operations from the host computer 100 (step 1012). Thereafter, the storage system 1000 processes data when unprocessed data remains in the data replication disk buffer extent 1130 or data replication memory buffer extent 1220 (transfer to the storage system 2000) (step 1013). When the data replication buffer extent becomes empty, the storage system 1000 stops the remote data replication (step 1014). After stopping the remote data replication, the storage system 1000 updates the data buffer extent configuration information table 1418, and specifically updates the contents for releasing the buffer extent that was secured for the remote data replication (step 1015). Thereafter, the storage system 1000 transmits a data replication stop notice to the management computer 300 (step 1016).

The management computer 300 receives the data replication stop notice (step 32128), and transmits a data replication start request to the storage system 3000 to which the virtual storage extent 1140 physically belongs. This message contains identification information of the virtual storage extent 1140 in which the remote data replication is to be started, and the information regarding the remote data replication mode after switching (step 32129).

The storage system 3000 receives the data replication start request (step 3001). Next, according to the data replication start request, the storage system 3000 updates the data replication buffer configuration information table 1418 (step 3002), and starts the remote data replication based on the designated remote data replication mode (step 3003). Thereafter, the storage system 3000 transmits the data replication start notice to the management computer 300, and ends the data replication start processing (step 3004).

The management computer 300 receives the data replication start notice, and ends the data replication switching processing (step 32130).

Figure 26:
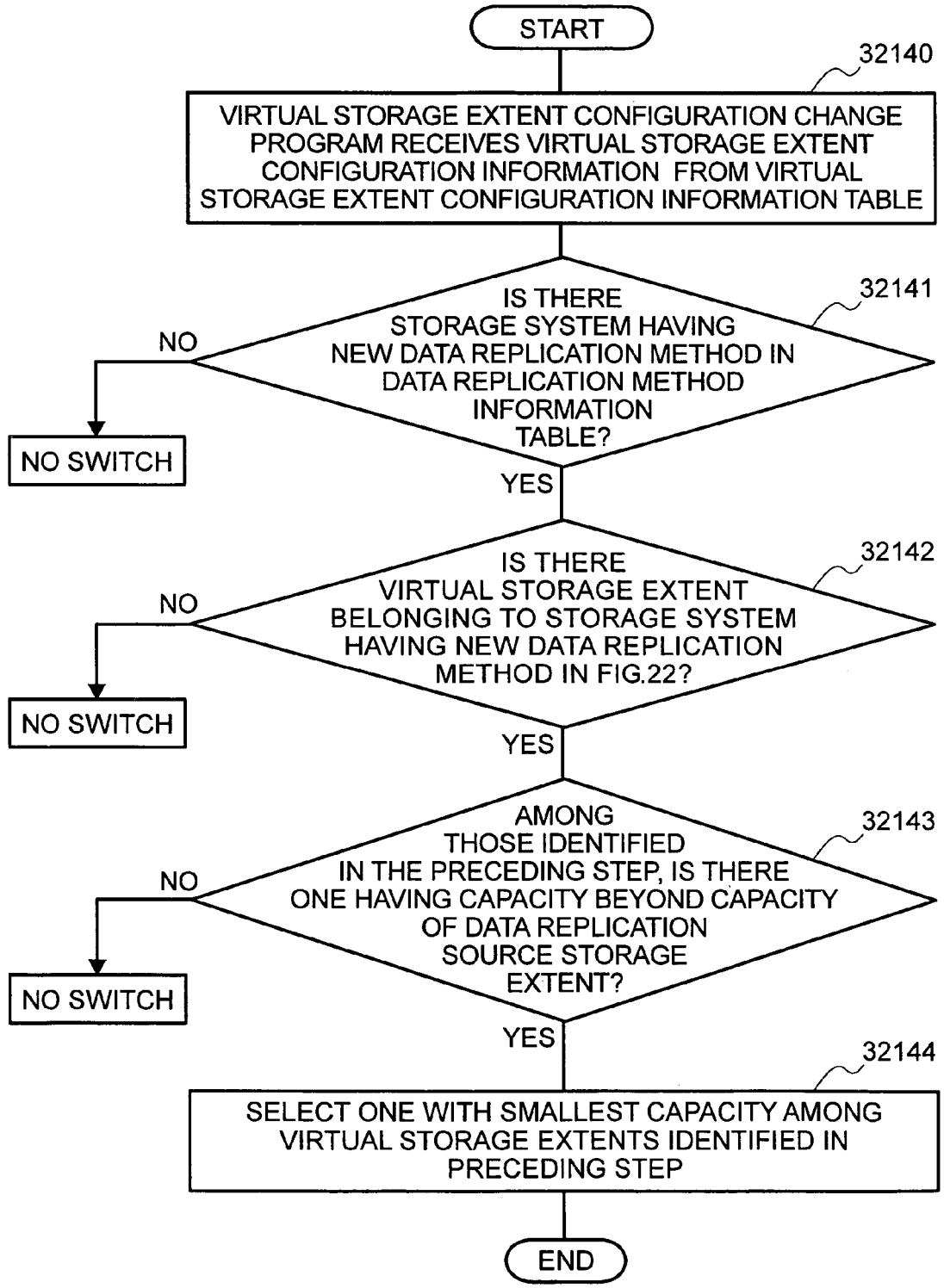
FIG. 26 is a flowchart showing an example of the processing of the virtual storage extent selection.

FIG. 26 is a flowchart showing procedural examples of the selection processing of the virtual storage extent 1140 at step 32123. Foremost, the management computer 300 acquires virtual storage extent configuration information from the virtual storage extent configuration information table 327 (step 32140).

Next, the management computer 300 searches for a storage system that is capable of executing the remote data replication mode after switching from the information concerning the remote data replication mode acquired at step 32120. For instance, when the remote data replication mode after switching determined at step 305 is a synchronous remote data replication mode, the management computer 300 refers to the data replication mode information table 328, and searches the storage system having the synchronous remote data replication mode program (step 32141). When information of the storage system 3000 that is capable of executing the remote data replication mode after switching is not registered in the data replication information table 328, the management computer 300 discontinues the data replication mode switching processing.

Meanwhile, when information of the storage system 3000 that is capable of executing the remote data replication mode after switching is registered in the data replication information table 328, the management computer 300 judges whether the replication source storage system has the virtual storage extent 1140 configured based on the storage extent of the storage system 3000 from the information of the virtual storage extent configuration information table 327 acquired at step 32140 (step 32142). When a corresponding virtual storage extent does not exist, the management computer 300 discontinues the remote data replication mode switching processing. Meanwhile, when a corresponding virtual storage extent does exits, the management computer 300 confirms the existence of the virtual storage extent 1140 having a capacity exceeding the capacity of the replication source storage system 1110 among the above (step 32143). When there is no virtual storage extent 1140 that satisfies these conditions, the management computer 300 discontinues the remote data replication switching processing.

When there is a virtual storage extent 1140 that satisfies these conditions at step 32143, the management computer 300 selects as the destination of replication of the replication source storage extent the virtual storage extent 1140 having the smallest storage capacity among the virtual storage extents 1140 satisfying the conditions at step 32143 (step 32144).

Incidentally, the processing procedures at step 32125 are the same.

Figure 27:
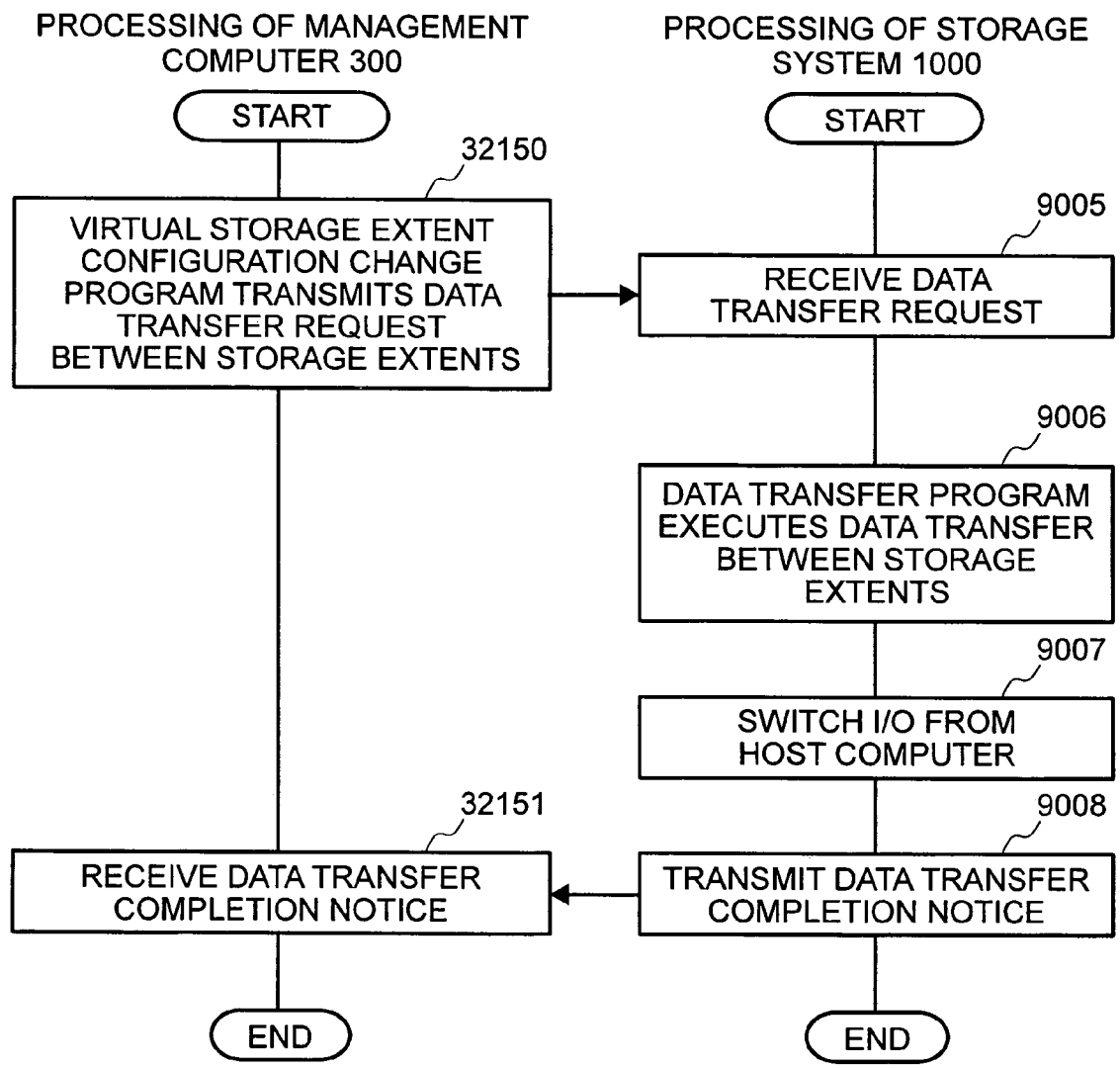
FIG. 27 is a flowchart showing an example of the data transfer processing between the storage extents to be performed by the management computer and the storage system.

FIG. 27 is a flowchart showing the procedural examples of the data transfer processing to be executed at step 32124. Foremost, the management computer 300 transmits to the storage system 1000 the data transfer request from the replication source storage extent 1110 (hereinafter also referred to as the "source storage extent") to the virtual storage extent 1110 (hereinafter also referred to as the "destination storage extent") selected at step 32123. This message contains the identification information of the storage extent 1110 or virtual storage extent 1140 selected at step 32123 illustrated in FIG. 24 (step 32150).

The storage system 1000 receives the data transfer request (step 9005), and, according to the data transfer request, executes the data transfer from the source storage extent 1110 to the destination storage extent 1110 (step 9006). After the data transfer is completed, the storage system 1000 switches the I/O destination from the host computer 100 from the source storage extent 1110 to the destination storage extent 1110 (step 9007). Thereafter, the storage system 1000 transmits a data transfer completion notice to the management computer 300, and ends the data transfer processing of the storage system 1000 (step 9008). The management computer 300 receives the data transfer completion notice and ends the data transfer processing routine (step 32151). Incidentally, the source and destination storage extents 1110 may be the virtual storage extent 1140.

Figure 28:
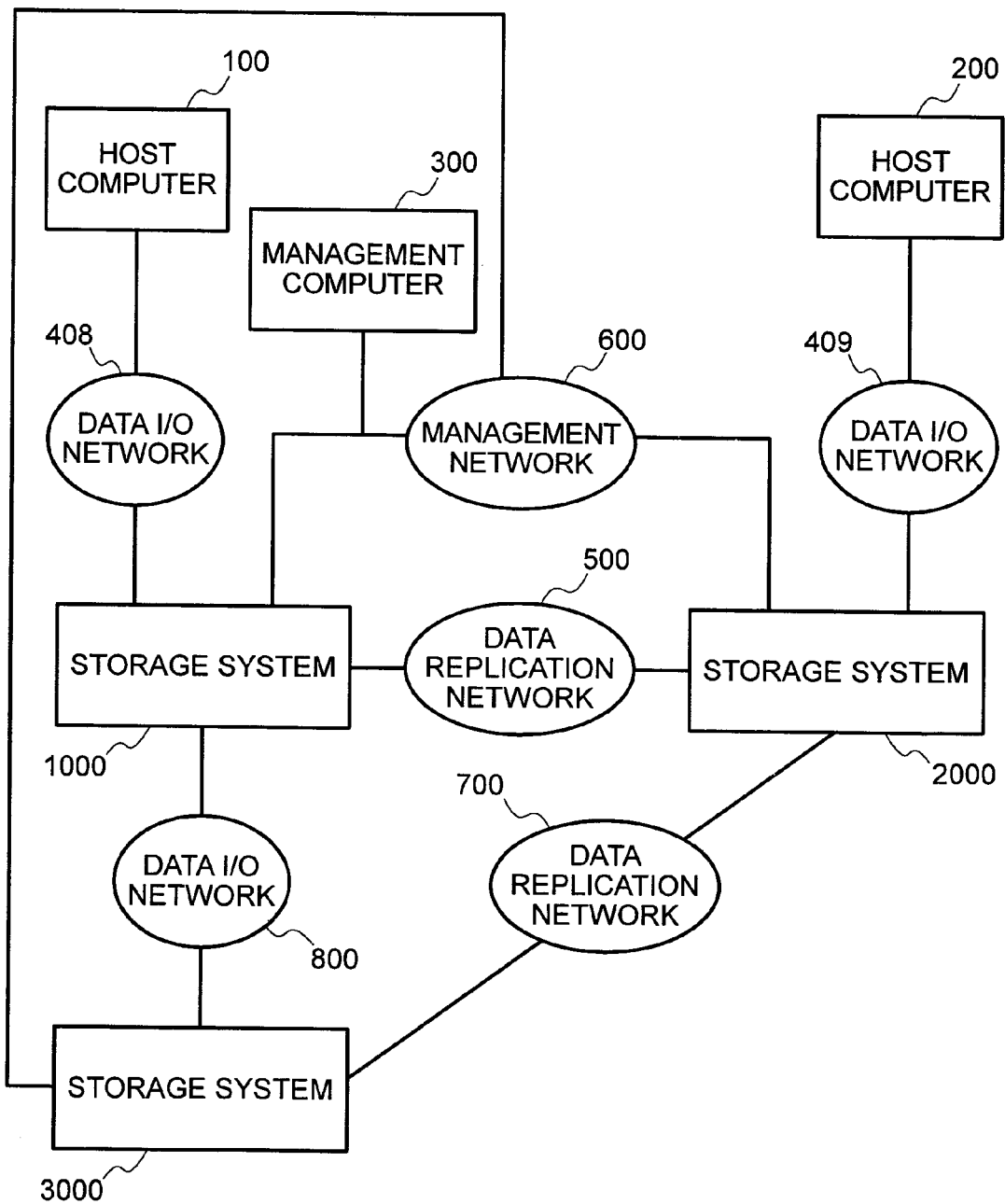
FIG. 28 is a block diagram showing an example of the computer system representing a modified embodiment.

Incidentally, in the present embodiment, as shown in FIG. 28, it would suffice even if there is only one storage system to become the data transfer destination. Here, the selection processing of the virtual storage extent in the storage system 2000 to be performed in this embodiment is not conducted. Thus, in this configuration, the virtual storage extent 1140 in the storage system 1000 created based on the storage extent of the storage system 3000 configures a pair association with the storage extent 1110 in the storage system 2000.

Further, the present embodiment was based on the premise that the storage system physically storing the data subject to remote data replication and the storage system to execute such remote data replication are the same. Therefore, upon switching the remote data replication mode, when there is a change in the storage system to execute such a remote data replication mode, incidental thereto, the data subject to remote data replication is transferred to the storage system to execute the remote data replication after switching. However, as another embodiment, the foregoing premise can be eliminated. In other words, the storage system physically storing the data subject to remote data replication and the storage system for executing such remote data replication may be separate. Here, the data transfer processing performed in the present embodiment will not be required. Still, when the remote data replication is actually conducted, data will be transferred from the storage system storing such data to the storage system for executing the remote data replication.

Incidentally, in the second embodiment, an example was described where the storage system to execute the remote data replication is changed from the storage system 1000 to the storage system 3000 (from the storage system providing the virtual storage extent to the host computer to the storage system having a storage extent corresponding to such virtual storage extent). Nevertheless, as another example, the opposite, that is, a case where the remote data replication being conducted with a storage system having a storage extent corresponding to the virtual storage extent, is executed with the storage system which provided the virtual storage extent to the host computer. In this case, the management computer, as in the second embodiment, confirms the existence of the provided relationship of the virtual storage extent between the storage systems. Further, in this case, information regarding the access rate may be the information on the access rate between the host computer and the storage system 1000, but it may also be the information on the access rate between the storage system 1000 and the storage system 3000.

What is claimed:

1. A storage system which is connectable to another storage system and a computer via a network, comprising:
   a controller;
   a plurality of interfaces connected to the controller and the network; and
   a plurality of storage devices connected to the controller,
   wherein the controller executes a transferring of data, which is to be stored in the plurality of storage devices based on an I/O request issued by the computer, to the another storage system via the network using one of a plurality of copy modes,
   wherein the controller switches the one of the plurality of copy modes to another one of the plurality of copy modes based on an access rate of I/O requests from the computer to the storage system and executes transferring data using said another one of the plurality of copy modes, wherein the plurality of copy modes comprise first and second copy modes, respectively,
   wherein the controller indicates completion of the I/O request after receiving notification of completion of storing the data from the another storage system when the first copy mode is used,
   wherein the controller indicates completion of the I/O request before receiving notification of completion of storing the data from the another storage system when the second copy mode is used, wherein the controller switches from the first copy mode to the second copy mode when the access rate exceeds a threshold,
   wherein the controller switches from the second copy mode to the first copy mode when the access rate drops below the threshold, and
   wherein the threshold is determined based on a formula.

2. A storage system according to claim 1,
   wherein the controller, in the second copy mode, stores journal data into a journal volume comprised of at least a portion of the plurality of storage devices, and
   wherein the controller uses the journal volume to store data sent by the computer after switching from the second copy mode to the first copy mode.

3. A storage system according to claim 2 further comprising a memory;
    wherein the controller, in the second copy mode, uses a part of the memory to store the data to be sent to the another storage system, and
    wherein the controller uses the part of the memory to store data sent from the computer after switching from the second copy mode to the first copy mode.

4. A storage system according to claim 3,
    wherein the controller switches from using the journal volume to using the part of the memory, or vice versa, based on a second threshold of the access rate in the second copy mode.

5. A storage system according to claim 4,
    wherein the controller switches from the first copy mode to the second copy mode in which the controller uses the part of the memory when the access rate exceeds the threshold, and
    wherein the controller switches from using the part of the memory to using the journal volume when the access rate exceeds the second threshold.

6. A system comprising:
    a first storage system connected to a computer and to a second storage system via a network; and
    a management computer connected to the first and the second storage system,
    wherein the first storage system comprises a plurality of storage devices,
    wherein the first storage system executes a transferring of data, which is to be stored in the plurality of storage devices based on an I/O request issued by the computer, to the second storage system via the network based on one of a plurality of copy modes,
    wherein the management computer gathers information of access frequency between the computer and the first storage system from the first storage system, decides to change the one of the plurality of copy modes to another one of the plurality of copy modes or not based on the gathered information of access frequency, and sends a command which indicates to the first storage system to change from the one of the plurality of copy modes to another one of the plurality of copy modes,
    wherein the first storage system changes the one of the plurality of copy modes to the another one of the plurality of copy modes based on the command and executes transmitting data to the second storage system based on the another one of the plurality of copy modes,
    wherein said one and said another copy modes comprise first and second copy modes, respectively,
    wherein the first storage system indicates completion of the I/O request after receiving notification of completion of storing the data from the second storage system when the first copy mode is used, and
    wherein the first storage system indicates completion of the I/O request before receiving notification of completion of storing the data from the second storage system when the second copy mode is used.

7. A system according to claim 6,
    wherein the management computer decides to change from the first copy mode to the second copy mode when the gathered access frequency exceeds a threshold and sends a second command which indicates to the first storage system to switch from the first copy mode to the second copy mode, and
    wherein the first storage system switches from the first copy mode to the second copy mode when it receives the second command.

8. A system according to claim 7,
    wherein the management computer decides to switch from the second copy mode to the first copy mode when the gathered access frequency drops below the threshold and sends a third command which indicates to the first storage system to switch from the second copy mode to the first copy mode, and
    wherein the first storage system switches from the second copy mode to the first copy mode when it receives the third command.

9. A system according to claim 8,
    wherein the first storage system, in the second copy mode, stores journal data into a journal volume comprised of at least a portion of the plurality of storage devices, and
    wherein the first storage system uses the journal volume to store data sent by the computer after switching from the second copy mode to the first copy mode.

10. A system according to claim 9, further comprising a third storage system connected to the first storage system, the second storage system and the management computer,
    wherein the first storage system supplies a plurality of logical storage units based on the storage area, which the third storage system has, to the computer,
    wherein the third storage system executes a transferring of data, to be stored in the plurality of logical storage units, to the second storage system via the network using the first copy mode,
    wherein the management computer gathers second information of access frequency between the first storage system and the third storage system from the third storage system, decides whether or not to switch from the first copy mode to the second copy mode based on the gathered second information of access frequency, and sends a fourth command which indicates to the third storage system to switch from the first copy mode to the second copy mode, and
    wherein the third storage system switches from the first copy mode to the second copy mode based on the fourth command and executes transferring of data to the second storage system using the second copy mode.

11. A system according to claim 10,
    wherein the management computer checks whether the third storage system can execute a data copy based on the second copy mode before sending the fourth command.

12. A system according to claim 11,
    wherein, if the third storage system cannot execute the data copy using the second copy mode, the management computer checks whether or not the first storage system can execute the data copy using the second copy mode, and, if the first storage system can execute the data copy based on the second copy mode, the management computer indicates to the third storage system to send data stored in the storage area corresponding to the plurality of logical units to the first storage system and indicates to the first storage system to store the data sent from the third storage system into a part of the storage area of the plurality of storage devices and to execute the data copy using the second copy mode after completion of storing data.

13. A system according to claim 11,
    wherein, if the third storage system cannot execute the data copy using the second copy mode, the management computer checks whether or not the first storage system can execute the data copy based on the second copy mode, and, if the first storage system can execute the data copy based on the second copy mode, the management computer indicates to the first storage system to execute the data copy using the second copy mode instead of the third storage system.

14. A storage system connected to a computer and an another storage system, via a network, comprising:
   means for controlling the storage system;
   means for connecting to the controlling means and the network; storing means for storing data;
   means for copying data from the storage system to the another storage system using one of a plurality of copy modes; and
   changing means for changing a copy mode of the storage system in accordance with an access frequency of I/O requests from said computer to said storage system,
   wherein the controlling means stores journal data to the storing means, and further comprising means for reserving or releasing a storage area of the storage means used for said journal data depending on the copy mode being used.

* * * * *